US010123348B2

(12) United States Patent
Vajapeyam et al.

(10) Patent No.: US 10,123,348 B2
(45) Date of Patent: Nov. 6, 2018

(54) ENHANCED CARRIER AGGREGATION ACTIVATION AND SCHEDULING REQUEST PROCEDURES

(71) Applicant: QUALCOMM Incorporated, San Diego, CA (US)

(72) Inventors: Madhavan Srinivasan Vajapeyam, San Diego, CA (US); Wanshi Chen, San Diego, CA (US); Jelena Damnjanovic, Del Mar, CA (US); Amir Aminzadeh Gohari, Sunnyvale, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 15/070,990

(22) Filed: Mar. 15, 2016

(65) Prior Publication Data

US 2016/0295607 A1 Oct. 6, 2016

Related U.S. Application Data

(60) Provisional application No. 62/141,765, filed on Apr. 1, 2015.

(51) Int. Cl.
*H04W 72/12* (2009.01)
*H04W 24/08* (2009.01)
(Continued)

(52) U.S. Cl.
CPC ......... *H04W 72/1284* (2013.01); *H04L 5/001* (2013.01); *H04L 5/0085* (2013.01);
(Continued)

(58) Field of Classification Search
CPC . H04W 72/1284; H04W 24/08; H04W 56/00; H04W 74/0833; H04L 5/001;
(Continued)

(56) References Cited

U.S. PATENT DOCUMENTS

2011/0243048 A1* 10/2011 Wang .................... H04L 5/0051
370/311
2011/0243106 A1 10/2011 Hsu et al.
(Continued)

OTHER PUBLICATIONS

Interdigital Communications, "Release of PUCCH Resources and Removal of SCell Configuration," 3GPP TSG-RAN WG2 #71, Tdoc R2-104814, Madrid, Spain, Aug. 23-27, 2010, 11 pgs., XP_50451955A, 3rd Generation Partnership Project.
(Continued)

*Primary Examiner* — Duc C Ho
(74) *Attorney, Agent, or Firm* — Holland & Hart LLP

(57) ABSTRACT

Methods, systems, and devices for wireless communication are described. A user equipment (UE) configured with several component carriers (CCs) may select one or more CCs for fast activation. The UE may, in various examples, autonomously select the CCs for fast activation or may receive signaling indicating such CCs. In some cases, the UE may place the selected CCs in a semi-active state by detecting and synchronizing the CCs while refraining from control channel monitoring. In other examples, the UE may identify a set of CCs that may be activated quickly based on channel conditions or that have activation interdependency, such as CCs in a physical uplink control channel (PUCCH) group. The UE may then trigger an activation for one of the selected CCs, determine it is capable of fast activation, and begin monitoring, e.g., for control information, after a reduced delay period based on the fast activation.

30 Claims, 21 Drawing Sheets

(51) Int. Cl.
*H04W 56/00* (2009.01)
*H04W 74/08* (2009.01)
*H04L 5/00* (2006.01)

(52) U.S. Cl.
CPC ........... *H04L 5/0098* (2013.01); *H04W 24/08* (2013.01); *H04W 56/00* (2013.01); *H04W 74/0833* (2013.01); *H04L 5/0032* (2013.01); *H04L 5/0048* (2013.01); *H04L 5/0053* (2013.01)

(58) Field of Classification Search
CPC ... H04L 5/0085; H04L 5/0098; H04L 5/0032; H04L 5/0048; H04L 5/0053
See application file for complete search history.

(56) References Cited

U.S. PATENT DOCUMENTS

| | | | |
|---|---|---|---|
| 2011/0292854 A1* | 12/2011 | Terry | H04L 5/001 370/311 |
| 2012/0106450 A1* | 5/2012 | Golitschek Edler Von Elbwart | H04L 1/0025 370/328 |
| 2012/0207089 A1 | 8/2012 | Kone | |
| 2013/0136015 A1* | 5/2013 | Ojala | H04L 5/001 370/252 |
| 2015/0049687 A1 | 2/2015 | Kim et al. | |
| 2018/0007731 A1* | 1/2018 | Park | H04W 76/04 |

OTHER PUBLICATIONS

ISA/EP, International Search Report and Written Opinion of the International Searching Authority, Int'l App. No. PCT/US2016/024874, dated Aug. 11, 2016, European Patent Office, Rijswijk, NL, 25 pgs.

Nokia Networks et al., "SR on SCell," 3GPP TSG-RAN WG2 Meeting #89, R2-150129, Athens, Greece, Feb. 9-13, 2015, 3 pgs., XP_50935483A, 3rd Generation Partnership Project.

Samsung, "Discussion on Random Access on SCell in Inter-ENB CA," 3GPP TSG-RAN WG2 Meeting #83bis, R2-133866, San Francisco, USA, Nov. 11-15, 2013, 3 pgs., XP_50736703A, 3rd Generation Partnership Project.

ISA/EP, Partial International Search Report of the International Searching Authority, Int'l. App. No. PCT/US2016/024874, dated May 31, 2016, European Patent Office, Rijswijk, NL, 8 pgs.

Nokia Corporation, "DRX and Carrier Aggregation," 3GPP TSG-RAN WG2 Meeting #70, Montreal, Canada, R2-102886, May 10-14, 2010, 7 pgs., XP_50423180A, 3rd Generation Partnership Project.

* cited by examiner

ENHANCED CARRIER AGGREGATION ACTIVATION AND SCHEDULING REQUEST PROCEDURES

CROSS REFERENCES

The present application for patent claims priority to U.S. Provisional Patent Application No. 62/141,765 by Vajapeyam et al., entitled "Enhanced Carrier Aggregation Activation And Scheduling Request Procedures" filed Apr. 1, 2015, assigned to the assignee hereof, and expressly incorporated by reference herein.

BACKGROUND

The following relates generally to wireless communication, and more specifically to enhanced carrier aggregation (eCA) activation and scheduling request procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, a UE may communicate with one or more base stations on multiple frequency bands, known as carriers. After configuration of the carriers, the UE may refrain from monitoring those carriers not being used (i.e., inactive or deactivated carriers) in order to conserve power. Activating a large number of carriers may take a significant amount of time. This may result in a delay or disruption in service, or may otherwise negatively affect communications by or with the UE.

SUMMARY

A user equipment (UE) configured with several component carriers (CCs) in carrier aggregation (CA) may select one or more CCs for fast activation. For example, the UE may place the selected CCs in a semi-activated state by detecting and synchronizing the CCs; but, unlike CCs in an activated state, a UE may refrain from monitoring control information or CCs in a semi-activated state. In other examples, the UE may identify a set of CCs that may be activated quickly based on channel conditions or that have activation interdependency; for instance, CCs in a physical uplink control channel (PUCCH) group may be capable of fast activation. The UE may trigger an activation for one of the selected CCs, determine it is capable of fast activation, and begin monitoring (e.g., for control information) after a reduced delay period based on the fast activation.

Additionally or alternatively, a UE configured for CA with a primary CC (PCC) and a secondary CC with a physical uplink control channel (PUCCH) (PUCCH SCC) may receive a scheduling request (SR) configuration that includes a common SR transmission threshold for both the PCC and the PUCCH SCC. For instance, a UE may transmit an SR on the PUCCH if an SR counter is below the threshold. Or, in some cases, if the SR counter exceeds the threshold, the UE may initiate a random access procedure on the PCC or the PUCCH SCC, or both.

A method of wireless communication is described. The method may include triggering activation of one or more CCs, determining an activation mode from a plurality of activation modes for the one or more CCs in response to the triggering, and monitoring the one or more CCs based at least in part on the activation mode.

An apparatus for wireless communication is described. The apparatus may include means for triggering activation of one or more CCs, means for determining an activation mode from a plurality of activation modes for the one or more CCs in response to the triggering, and means for monitoring the one or more CCs based at least in part on the activation mode.

A further apparatus for wireless communication is described. The apparatus may include a processor, memory in electronic communication with the processor, and instructions stored in the memory and operable, when executed by the processor, to cause the apparatus to trigger activation of one or more CCs, determine an activation mode from a plurality of activation modes for the one or more CCs in response to the triggering, and monitor the one or more CCs based at least in part on the activation mode.

A non-transitory computer-readable medium storing code for wireless communication is described. The code may include instructions executable to trigger activation of one or more CCs, determine an activation mode from a plurality of activation modes for the one or more CCs in response to the triggering, and monitor the one or more CCs based at least in part on the activation mode.

In some examples of the method, apparatuses, or non-transitory computer-readable medium described herein, the activation mode may be or include a reduced activation period that is shorter than a standard activation period. Each activation mode of the plurality of activation modes may be associated with a corresponding activation period; and determining the activation mode may include selecting the activation mode from a set of activation modes comprising at least one second activation mode associated with the reduced activation period. Additionally or alternatively, some examples may include processes, features, means, or instructions for determining that the activation mode by selecting the activation mode from a set of activation modes that includes at least one second activation mode with an activation period that is longer than the reduced activation period.

In some examples of the method, apparatuses, or non-transitory computer-readable medium described herein, triggering activation of the one or more CCs may include receiving an activation command from a serving cell. Additionally or alternatively, in some examples, triggering activation of the one or more CCs includes identifying a trigger condition that includes a channel measurement or an RRC condition, or both.

In some examples of the method, apparatuses, or non-transitory computer-readable medium described herein, monitoring the one or more CCs includes monitoring a control channel of the one or more CCs, monitoring channel information of the one or more CCs, or both. Additionally or alternatively, some examples may include processes, features, means, or instructions for performing a detection procedure or a synchronization procedure prior to triggering activation the one or more CCs based at least in part on the activation mode.

Some examples of the method, apparatuses, or non-transitory computer-readable medium described herein may further include processes, features, means, or instructions for transmitting an indication that the one or more CCs are associated with the activation mode. Additionally or alternatively, in some examples, the message may be a CSI message for the one or more CCs, a MAC layer message, an RRC message, a measurement report, or any combination thereof.

Some examples of the method, apparatuses, or non-transitory computer-readable medium described herein may further include processes, features, means, or instructions for measuring a channel quality of the one or more CCs, and determining the activation mode for the one or more CCs may be based at least in part on the measured channel quality. Additionally or alternatively, some examples may include processes, features, means, or instructions for identifying an activated CC, and determining the activation mode may be based at least in part on the activated CC.

Some examples of the method, apparatuses, or non-transitory computer-readable medium described herein may further include processes, features, means, or instructions for receiving an indication of an activation group that may include the one or more CCs, and identifying the one or more CCs may be based at least in part on the activation group. Additionally or alternatively, some examples may include processes, features, means, or instructions for triggering deactivation of the one or more CCs, determining a deactivation mode, and maintaining synchronization with the one or more CCs based at least in part on the deactivation mode.

A further method of wireless communication is described. The method may include receiving a carrier aggregation (CA) configuration that includes a primary CC with a and a secondary CC with a PUCCH, and receiving an SR configuration that includes an SR transmission threshold for the primary CC, the secondary CC, or both.

A further apparatus for wireless communication is described. The apparatus may include means for receiving a CA configuration that includes a primary CC and a secondary CC with a PUCCH, and means for receiving an SR configuration that includes an SR transmission threshold for the primary CC, the secondary CC, or both.

A further apparatus for wireless communication is described. The apparatus may include a processor, memory in electronic communication with the processor, and instructions stored in the memory and operable, when executed by the processor, to cause the apparatus to receive a CA configuration that includes a primary CC and a secondary CC with a secondary PUCCH, and receive an SR configuration that includes an SR transmission threshold for the primary CC or the secondary CC, or both.

A non-transitory computer-readable medium storing code for wireless communication is described. The code may include instructions executable to receive a CA configuration that includes a primary CC and a secondary CC with a secondary PUCCH, and receive an SR configuration that includes an SR transmission threshold for the primary CC or the secondary CC, or both.

Some examples of the method, apparatuses, or non-transitory computer-readable medium described herein may further include processes, features, means, or instructions for receiving the SR configuration on the primary CC and the secondary PUCCH enabled CC. Some examples may include processes, features, means, or instructions for determining that an SR counter is less than the SR transmission threshold, and transmitting an SR on the secondary CC with a PUCCH based at least in part on the determination. Additionally or alternatively, some examples may include processes, features, means, or instructions for determining that an SR counter is greater than the SR transmission threshold and releasing PUCCH and sounding reference signal (SRS) resources. Some examples may also include processes, features, means, or instructions for initiating a RACH procedure based at least in part on the determination or the release of PUCCH, or both.

In some examples of the method, apparatuses, or non-transitory computer-readable medium described herein, the SR configuration is associated with an SR counter for the primary CC, the secondary CC, or both. Additionally or alternatively, in some examples, the SR configuration is associated with a first SR counter for the primary CC and a second SR counter for the secondary CC.

A further method of wireless communication is described. The method may include transmitting an activation message to a wireless device for one or more CCs, determining an activation mode for the one or more CCs, and communicating with the wireless device using the one or more CCs based at least in part on the activation mode.

A further apparatus for wireless communication is described. The apparatus may include means for transmitting an activation message to a wireless device for one or more CCs, means for determining an activation mode for the one or more CCs, and means for communicating with the wireless device using the one or more CCs based at least in part on the activation mode.

A further apparatus for wireless communication is described. The apparatus may include a processor, memory in electronic communication with the processor, and instructions stored in the memory and operable, when executed by the processor, to cause the apparatus to transmit an activation message to a wireless device for one or more CCs, determine an activation mode for the one or more CCs, and communicate with the wireless device using the one or more CCs based at least in part on the activation mode.

A further non-transitory computer-readable medium storing code for wireless communication is described. The code may include instructions executable to transmit an activation message to a wireless device for one or more CCs, determine an activation mode for the one or more CCs, and communicate with the wireless device using the one or more CCs based at least in part on the activation mode.

In some examples of the method, apparatuses, or non-transitory computer-readable medium described herein, the activation mode may be associated with a reduced activation period, and determining the activation mode may include selecting the activation mode from a set of activation modes may include at least one second activation mode with an activation period that is longer than the reduced activation period. Additionally or alternatively, some examples may include processes, features, means, or instructions for transmitting a semi-activation signal to the wireless device, and determining the activation mode may be based at least in part on the semi-activation signal.

Some examples of the method, apparatuses, or non-transitory computer-readable medium described herein may further include processes, features, means, or instructions for receiving a message from the wireless device indicating the one or more CCs, and determining the activation mode may be based at least in part on the message. Additionally or alternatively, some examples may include processes, features, means, or instructions for transmitting an indication of an activation group to the wireless device, and the activation group may include the one or more CCs and determining the activation mode may be based at least in part on the activation group.

Some examples of the method, apparatuses, or non-transitory computer-readable medium described herein may further include processes, features, means, or instructions for activating an anchor carrier for the wireless device, and determining the activation mode may be based at least in part on activating the anchor carrier.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

A user equipment (UE) configured with several component carriers (CCs) in carrier aggregation (CA) may select one or more CCs for fast activation, which may reduce delay associated with activating configured CCs from a deactivated state. The benefits of such fast activation may be pronounced in a CA configuration having a large number of CCs or other variables that may introduce undesirable system performance. Improvements from fast activation may thus be significant in systems employing enhanced carrier aggregation (eCA), for example, because eCA operations may involve a large number of component carriers (CCs), use of unlicensed spectrum, or use of enhanced CCs.

Individually activating a large number of cells, e.g., up to 32 cells in eCA, may involve significant signaling overhead and a relatively large activation delay across carriers. Fast activation techniques may thus be employed to modify CC activation procedures or reduce the activation time for one or several configured CCs. For example, activation timing may be modified to accommodate activation dependencies among secondary cells (SCells) or secondary CCs (SCCs) in a physical uplink control channel (PUCCH) group or for cells operating in unlicensed spectrum using listen-before-talk (LBT) operations.

In some examples, a UE may place some CCs in a semi-activated state prior to activation. This semi-activation may include performing cell detection and synchronization, but may not include control channel monitoring or channel state reporting. In other examples, a UE may identify a subset of configured CCs that are capable of fast activation based on channel conditions. Activation of CCs with good radio link quality may be more expedient, as compared with CCs having poor link quality, and so identifying CCs based on link quality may allow a UE to compress activation procedures. In another example, a UE may identify CCs for fast activation based on inter-dependency between activation states. Some CCs may be activated faster, as compared with other CCs, if the CC to be activated is related or dependent on an already-activated CC.

In addition to fast activation for CCs, the present disclosure also describes techniques for enabling scheduling requests (SRs) to be transmitted on SCells or SCCs, which may decrease delays associated with conveying SRs in a CA configuration. For example, a UE may utilize either a PCC or a PUCCH SCC, or both, for transmitting an SR. Various SR thresholds may be employed to facilitate SR transmissions in the context of PUCCH groups.

Aspects of the disclosure are initially described in the context of a wireless communication system. Specific examples are then described for semi-activation, channel quality based activation, and group based activation. These and other aspects of the disclosure are further illustrated by and described with reference to apparatus diagrams, system diagrams, and flowcharts that relate to eCA activation and scheduling request procedures.

Figure 1:
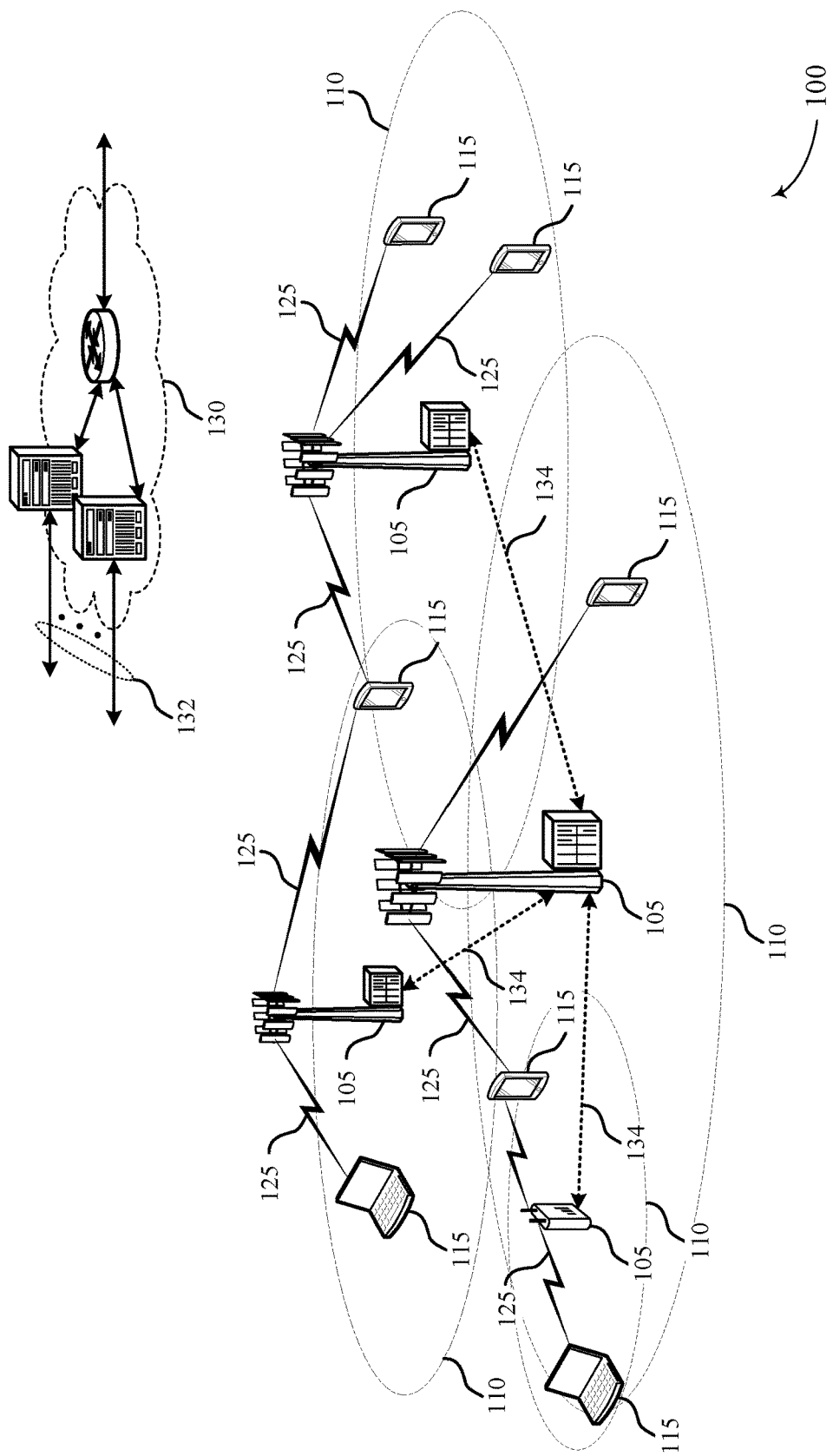
FIG. 1 illustrates an exemplary wireless communications system that supports enhanced carrier aggregation (eCA) activation and scheduling request procedures in accordance with various aspects of the present disclosure.

FIG. 1 illustrates an example of a wireless communications system 100 that supports fast activation and scheduling request procedures in accordance with various aspects of the present disclosure. The wireless communications system 100 includes base stations 105, UEs 115, and a core network 130. In some examples, the wireless communications system 100 may be a Long Term Evolution (LTE)/LTE-advanced (LTE-a) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115. The base stations 105 may communicate with UEs 115 in a fast activation mode. In some examples, base stations 105 may be configured to receive SRs via a PCC or a PUCCH SCC, or both.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may be a cellular phone, a wireless modem, a handheld device, a personal computer, a tablet, a personal electronic device, a machine type communication (MTC) device or the like. The UEs 115 may communicate with base stations 105. In some examples, UEs 115 may be configured to autonomously, or in accordance with received signaling, identify and activate carriers using a fast activation mode, as describe below. Additionally or alternatively, UEs 115 may be configured to transmit SRs within different PUCCH groups. An SR configuration may be received on the primary CC or a PUCCH SCC, or both.

The base stations 105 may support, and may communicate with the core network 130 and with one another to identify, signal, or otherwise support fast activation and various SR transmissions as described below. For example, the base stations 105 may interface with the core network 130 through backhaul links 132 (e.g., S1, etc.). The base stations 105 may also communicate with one another over backhaul links 134 (e.g., X2, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) 105 in some examples.

A communication link 125 may include one or more frequency ranges organized into carriers. A carrier may also be referred to as a CC, a layer, a channel, etc. The term "component carrier" of CC may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Individual CC may thus be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. Multiple component carriers may be aggregated or utilized concurrently to provide some UEs 115 with greater bandwidth and, e.g., higher data rates. A base station 105 may configure a UE 115 for communication using a number of CCs, but if the CCs are not actively being used, they remain in an inactive or deactivated state (that is, the UE 115 may not monitor them for scheduled transmissions).

A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. Some wireless configurations may be limited to five component carriers per UE 115. In some configurations, however, eCA operations may be employed, and an increased number of carriers may be used (e.g., up to 32 CCs). If a large number of CCs are configured, it may take significant time to activate each CC, especially if the activation of a given CC depends on prior activation of another CC. Thus, a UE may identify some CCs as candidates for fast activation by performing semi-activation steps, determining that the CCs have good channel quality, or by determining that an anchor carrier has been activated.

In some cases, a CC may be limited to a frequency range of up to 20 MHz. Different CCs may utilize different combinations of frequency division duplexing (FDD) and time division duplexing (TDD). In some cases, a UE 115 may be served by cells from two or more base stations 105 that are connected by a non-ideal backhaul link 134 in dual connectivity operation. For example, the connection between the serving base stations 105 may not be sufficient to facilitate precise timing coordination. Thus, in some cases, the cells serving a UE 115 may be divided into multiple timing adjustment groups (TAGs). Each TAG may be associated with a different timing offset, such that the UE 115 may synchronize UL transmissions differently for different UL carriers.

A UE 115 may communicate with a single base station 105 utilizing multiple carriers, and may also communicate with multiple base stations simultaneously on different carriers. Each cell of a base station 105 may include an DL CC or an UL CC, or both. The coverage area 110 of each serving cell for a base station 105 may be different (e.g., CCs on different frequency bands may experience different path loss). In some examples, one carrier is designated as the primary carrier, or PCC, for a UE 115, which may be served by a primary cell (PCell). Primary cells may be semi-statically configured by higher layers (e.g., radio resource control (RRC), etc.) on a per-UE basis. Certain uplink control information (UCI), e.g., physical uplink control channel (PUCCH), may be carried by the primary cell. Additional carriers may be designated as secondary carriers, or SCCs, which may be served by secondary cells (SCells). Secondary cells may likewise be semi-statically configured on a per-UE basis. In some cases, secondary cells may not include or be configured to transmit the same control information as the primary cell. In some cases, however, one or more SCells may be designated to carry PUCCH, and other SCells may be organized into PUCCH groups based on which CC is used to carry the associated UL control information. In some cases, a PCell may include both a primary UL CC and a primary DL CC, while an SCell may include a DL CC (and an UL CC if it is PUCCH enabled).

A UE 115 attempting to access a wireless network, such as the system 100, may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical broadcast control channel (PBCH). The MIB may contain system bandwidth information, an system frame number (SFN), and a physical HARQ indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain RRC configuration information related to random access channel (RACH) procedures, paging, PUCCH, physical uplink control channel (PUSCH), power control, sounding reference signal (SRS), and cell barring. In some cases, a UE 115 may receive one or more synchronization or system information signals on a CC prior to activating the CC (i.e., it may place the CC in a semi-activated state) in order to facilitate subsequent fast activation of the CC.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an UL resource grant, a timing advance and a temporary cell specific radio network temporary identity (C-RNTI). The UE 115 may then transmit an RRC connection request along with a temporary mobile subscriber identity (TMSI), if the UE 115 has previously been connected to the same wireless network, or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message, e.g., if there is a conflict with another UE 115, it may repeat the RACH process by transmitting a new RACH preamble. In some cases, a RACH procedure may also be initiated based on a communication failure with a cell. For example, a RACH may be initiated if a scheduling request (SR) retransmission counter reaches a maximum value without receiving a grant.

PUCCH may be used for UL acknowledgements (ACKs), scheduling requests (SRs) and channel quality indicators (CQI) and other UL control information. A PUCCH may be mapped to a control channel defined by a code and two consecutive resource blocks. UL control signaling may depend on the presence of timing synchronization for a cell. PUCCH resources for SR and CQI reporting may be assigned (and revoked) through RRC signaling. In some cases, resources for SR may be assigned after acquiring synchronization through a RACH procedure. In other cases, an SR may not be assigned to a UE 115 through the RACH (i.e., synchronized UEs may or may not have a dedicated SR channel). PUCCH resources for SR and CQI may be lost when the UE is no longer synchronized.

A base station 105 may gather channel condition information from a UE 115 in order to efficiently configure or schedule the channel. This information may be sent from the UE 115 in the form of a channel state report. A channel state report may contain an RI requesting a number of layers to be used for DL transmissions (e.g., based on the antenna ports of the UE 115), a PMI indicating a preference for which precoder matrix should be used (based on the number of layers), and a channel quality indicator (CQI) representing the highest modulation and coding scheme (MCS) that may be used. CQI may be calculated by a UE 115 after receiving predetermined pilot symbols such as cell specific reference signals (CRS) or channel state information reference signals (CSI-RS). Rank indicator (RI) and precoding matrix indicator (PMI) may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105. A UE 115 may transmit information relevant to fast activation, e.g., information about which carriers are suitable for fast action, in channel state reports.

Thus, a UE 115 configured with a large number of CCs may select one or more CCs for fast activation. For example, the UE 115 may place the selected CCs in a semi-activated state by detecting and synchronizing the CCs. In other examples, the UE 115 may identify a set of CCs that may be activated quickly based on channel conditions or that have activation interdependency (such as CCs in a physical uplink control channel (PUCCH group). The UE 115 may then trigger an activation for one of the selected CCs, determine it is capable of fast activation, and begin monitoring after a reduced delay based on the fast activation.

Figure 2:
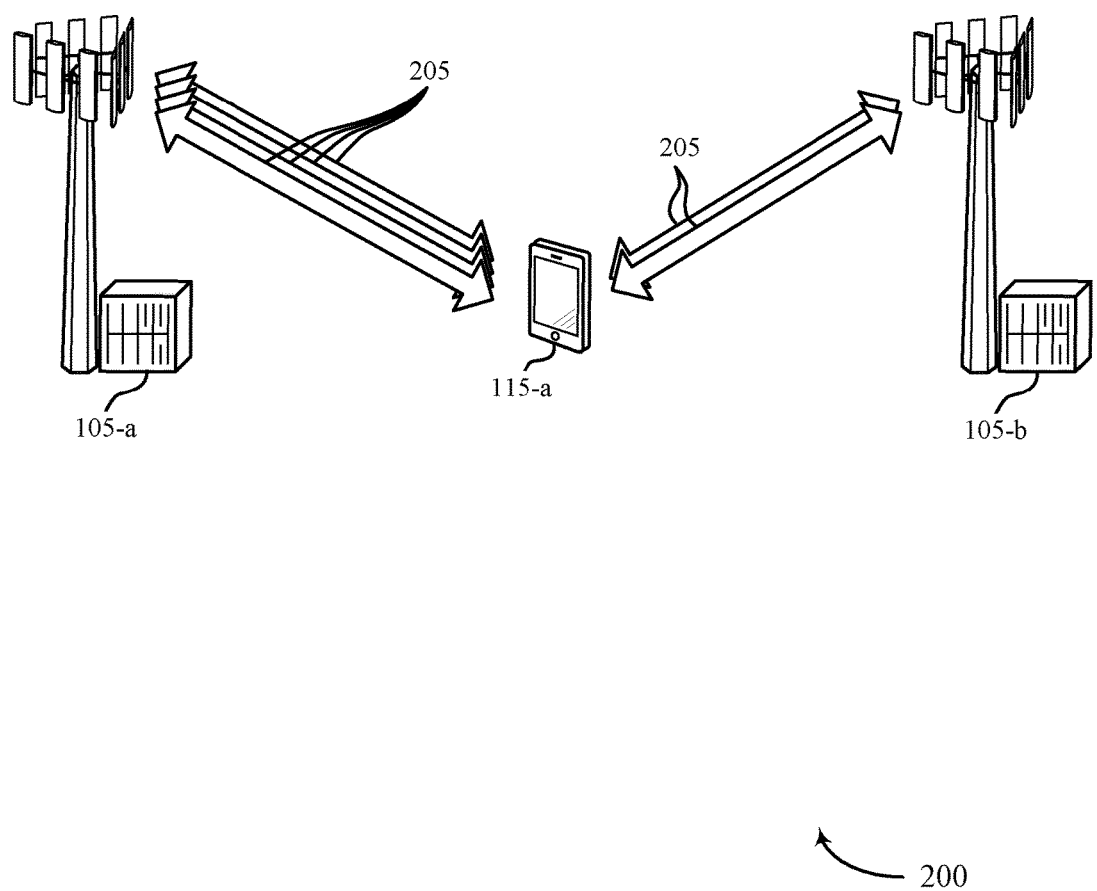
FIG. 2 illustrates an exemplary wireless communications system that supports eCA activation and scheduling request procedures in accordance with various aspects of the present disclosure.

FIG. 2 illustrates an example of a wireless communications system 200 for eCA activation and scheduling request procedures in accordance with various aspects of the present disclosure. Wireless communications system 200, may for instance, include a UE 115 that may identify one or several CCs 205 for fast activation based on preforming steps for semi-activation, identifying CCs 205 with good radio link quality, or identifying a group with an activated anchor CC 205. Wireless communications system 200 may include a UE 115-*a*, base station 105-*a*, and base station 105-*b*, which may be examples of the corresponding devices described with reference to FIG. 1. The methods described may also apply to a CA or eCA configuration based on CCs received from a single base station.

In some examples, UE 115-*a* may place some CCs 205 in a semi-activated state prior to activation. Semi-activation may include performing cell detection and synchronization, and may not include control channel monitoring or channel state reporting. This may reduce the time used if the semi-activated CC 205 is subsequently activated. Semi-activation may be triggered in several ways. For example, UE 115-*a* may receive a media access control (MAC) or radio resource control (RRC) message from base station 105-*a*, or UE 115-*a* may initiate the semi-activation autonomously (e.g., based on the cell channel quality). UE 115-*a* may also deactivate a cell using these or other signal types, or in some cases, based on the expiration of a timer. Once a UE 115-*a* has semi-activated one or more CCs 205, it may transmit an indication to base station 105-*a* by, for example, transmitting valid or out-of-range CSI for the semi-active CC or via MAC or RRC signaling such as in a measurement report.

In some cases, UE 115-*a* may identify a subset of configured CCs 205 that are capable of fast activation based on channel conditions. For example, activation of CCs 205 with good radio link quality may not take as much time as activation of other CCs with poor link quality; so if CCs 205 with good radio link quality are identified in advance, and UE 115-*a* signals the identified CCs 205 to a serving cell, the activation procedures may be compressed as compared to previously standardized operations, for example. For instance, if UE 115-*a* determines that channel measurements for a CC 205 are above a threshold, UE 115-*a* may send an indication to base station 105-*a* in a measurement report or in a MAC control message. UE 115-*a* may also trigger an indication when the CC 205 may no longer be fast-activated—e.g., when a timer expires or when radio conditions become worse.

In another example, UE 115-*a* may identify CCs 205 for fast activation based on inter-dependency between activation states. For instance, some CCs 205 may be activated faster, as compared to previously standardized operations, as long as at least one other cell is already activated, such as when a PUCCH enabled secondary cell (SCell) is already activated for a PUCCH group. Group activation (e.g., semi-activation or identification) may be implicit or explicit. Implicit activation may be based on the activation of an "anchor" cell, such as the PUCCH enabled cell. If the anchor cell is activated, UE 115-*a* may identify the other configured cells in the dependent group as candidates for fast activation, which may be autonomously or based on a previous fast activation configuration. In some cases, the UE may then signal the group to base station 105-*a*. For explicit activation, base station 105-*a* may indicate that a set of CCs 205 are to be candidates for fast activation when the anchor cell is activated.

In some cases, the fast activation may be based on both UE 115-*a* and base station 105-*a* awareness of which CCs are ready for fast activation. This may enable either UE 115-*a* or base station 105-*b* to reduce a waiting interval associated with the activation. For example, in some cases, base station 105-*a* may give UE 115-*a* a certain amount of time to perform detection and synchronization. This time period may be reduced if the detection or synchronization is already accomplished or if the channel conditions are good. Thus, base station 105-*a* may wait for a reduced period before proceeding to communication with UE 115-*a*. In other words, in some examples, fast activation may include or be accomplished by both UE 115-*a* and base station 105-*b* operating according to a reduced time interval for detection and synchronization than the devices would employ in a typical, or previously standardized activation procedure.

Wireless communications system 200 may also illustrate a configuration for enabling scheduling requests (SRs) to be transmitted on SCells to decrease a delay in conveying the SR. For example, UE 115-*a* may utilize a single SR pool, and may use the first configured opportunity to transmit SRs. The SR may be transmitted based on an SR counter and a configured SR transmission maximum, either of which may be based on cell groups such as PUCCH groups. For example, a single SR transmission maximum parameter may be used across multiple cells, and the SR counter may not distinguish between cells. If the SR counter exceeds the SR transmission maximum, UE 115-*a* may release PUCCH/SRS transmissions (e.g., PUCCH or SRS resources) for all cells in all cell groups. In another example, a single SR transmission maximum may be used across cell groups, and each group may utilize a separate SR counter. If the SR counter exceeds the SR transmission maximum for a given group, UE 115-*a* may release PUCCH/SR transmissions for all cells in that group. In another example, each group may have a separate SR transmission maximum (and separate counters). If the SR counter for the group exceeds the SR transmission maximum for that group, UE 115-*a* releases all PUCCH/SRS for the cells in the PUCCH group.

Figure 3:
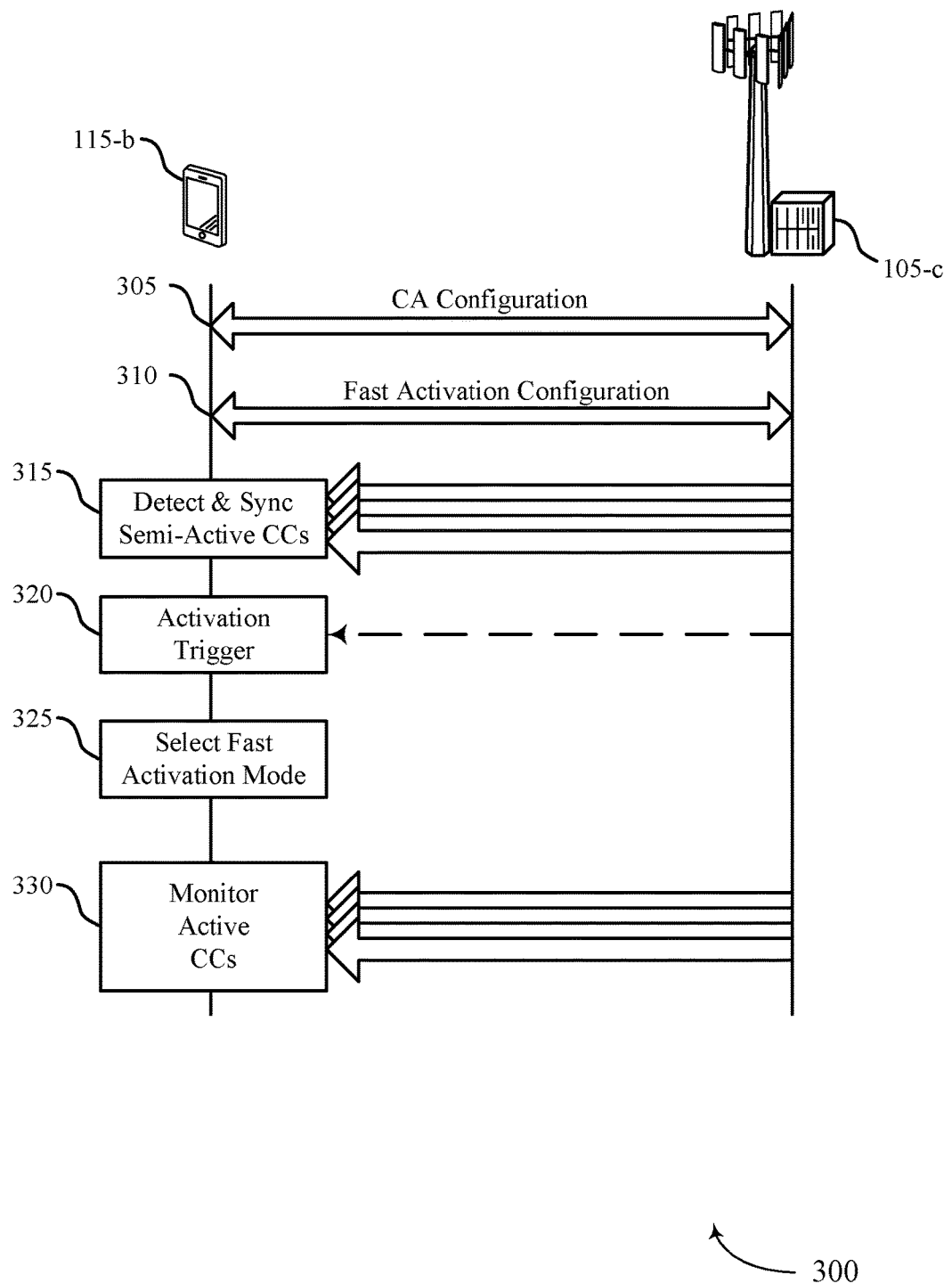
FIGS. 3-5 illustrate exemplary process flows in a system or systems that support eCA activation and scheduling request procedures in accordance with various aspects of the present disclosure.

FIG. 3 illustrates an example of a process flow 300 in a system that supports eCA activation and scheduling request procedures in accordance with various aspects of the present disclosure. Process flow 300 may illustrate an example in which UE 115-*b* places one or more CCs in a semi-activation or semi-active state by preforming detection or synchronization. Process flow 300 may include UE 115-*b* and base station 105-*c*, which may be examples of corresponding devices described with reference to FIGS. 1-2.

At 305, UE 115-*b* and base station 105-*c* may establish a CA or eCA configuration including a number of CCs. For example, UE 115-*b* may receive a CA configuration that may include a PCC and a PUCCH SCC.

At 310, UE 115-*b* and base station 105-*c* may establish a fast activation configuration including a fast activation mode. For example, base station 105-*c* may transmit a semi-activation signal to UE 115-*b*.

At 315, UE 115-*b* may receive synchronization or system information signals to detect or synchronize with one or more identified CCs. Thus, UE 115-*b* may perform the detection or synchronization procedure prior to triggering activation of the CCs based on the activation mode. In some cases, UE 115-*b* may transmit a message to base station 105-*c* indicating that the CCs are associated with the activation mode (e.g., that they are semi-activated). In some examples, the message includes a CSI message for the CCs, a MAC layer message, an RRC message, or a measurement report. In some cases, detection or synchronization may be one aspect of a semi-activated state, and semi-activated CCs may maintain the synchronization until they are activated or deactivated.

At 320, UE 115-*b* may trigger an activation for the semi-activated CCs. This may include receiving an activation command from base station 105-*c*. In some examples, triggering activation of the CCs includes identifying a trigger condition, which may include a channel measurement or an RRC condition, or both.

At 325, UE 115-*b* may determine an activation mode (e.g., select a fast activation procedure) for the semi-activated CCs. In some examples, the activation mode may include or may be associated with a reduced activation period, that is, an activation period that is shorter than a standard activation period. The UE 115-*b* may select the activation mode from a set of activation modes, which may include a second activation mode (e.g., a default, typical, or non-fast activation mode) with an activation period that may be longer than the reduced activation period of the fast activation mode. In some cases, base station 105-*c* may also determine the activation mode for the CCs.

At 330, UE 115-*b* may monitor system information or control channels from base station 105-*c* based on the fast activation (e.g., based on the activation mode). UE 115-*b* and base station 105-*c* may then communicate using the CCs based on the activation mode; for example, they may begin communication sooner by compressing delays or wait timers used during the activation process. In some cases, monitoring control channels and system information may be an aspect of being in an activated state. Thus, in some examples configured CCs may be neither synchronized nor monitored, semi-activated CCs may be synchronized but not monitored, and activated CCs may be both synchronized and monitored.

In some cases, UE 115-*b* may trigger deactivation of the CCs, determine a deactivation mode, and maintain synchronization with the CCs based on the deactivation mode.

Figure 4:
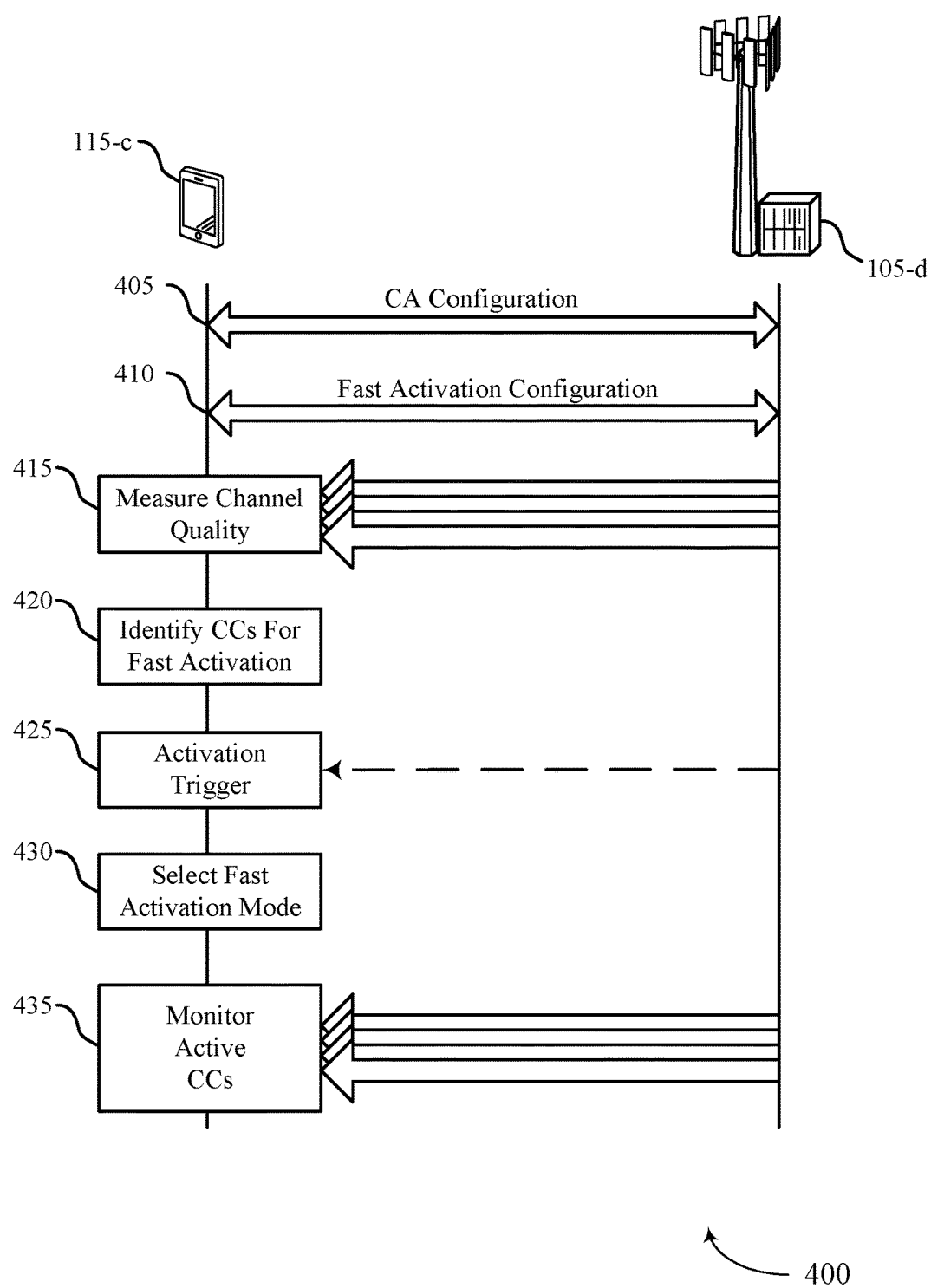

FIG. 4 illustrates an example of a process flow 400 in a system that supports eCA activation and scheduling request procedures in accordance with various aspects of the present disclosure. Process flow 400 may illustrate an example in which UE 115-*c* identifies one or more CCs for fast activation based on channel quality. Process flow 400 may include UE 115-c and base station 105-d, which may be examples of corresponding devices described with reference to FIGS. 1-2.

At 405, UE 115-c and base station 105-d may establish a CA or eCA configuration including a number of CCs. For example, UE 115-c may receive a CA configuration that includes a PCC and a PUCCH SCC.

At 410, UE 115-c and base station 105-d may establish a fast activation configuration including a fast activation mode based on channel quality.

At 415, UE 115-c may measure a channel quality of the CCs and at 420, may identify one or more CCs for fast activation mode based on having a good channel quality, which may be an objective measure of the ability of the UE 115-c to efficiently utilize the channel. In some cases, UE 115-c may transmit a message to base station 105-d indicating that the CCs are associated with the activation mode. In some examples, the message may include a CSI message for the CCs, a MAC layer message, an RRC message, or a measurement report.

At 425, UE 115-c may trigger an activation for the identified CCs with good channel quality. In some examples, triggering activation of the CCs includes receiving an activation command from base station 105-d. In some examples, triggering activation of the CCs includes identifying a trigger condition that may include a channel measurement or an RRC condition, or both.

At 430, UE 115-c may determine an activation mode (e.g., select a fast activation procedure) for the semi-activated CCs. In some examples, the activation mode may be associated with a reduced activation period, in other words an activation period that is shorter than a standard activation period. The UE 115-c may select the activation mode with the reduced activation period from a set of activation modes, such as a set including a standard activation mode associated with the standard activation period and a fast activation mode associated with the reduced activation period. In some cases, base station 105-d may also determine the activation mode for the CCs (e.g., by receiving an indication from UE 115-c).

At 435, UE 115-c may monitor system information or control channels from base station 105-d based on the fast activation (e.g., based on the activation mode). UE 115-c and base station 105-d may then communicate using the CCs based on the activation mode. For instance, as described elsewhere herein, UE 115-c and base station 105-d may begin communication sooner by compressing one or more delays or wait timers used during the activation process.

Figure 5:
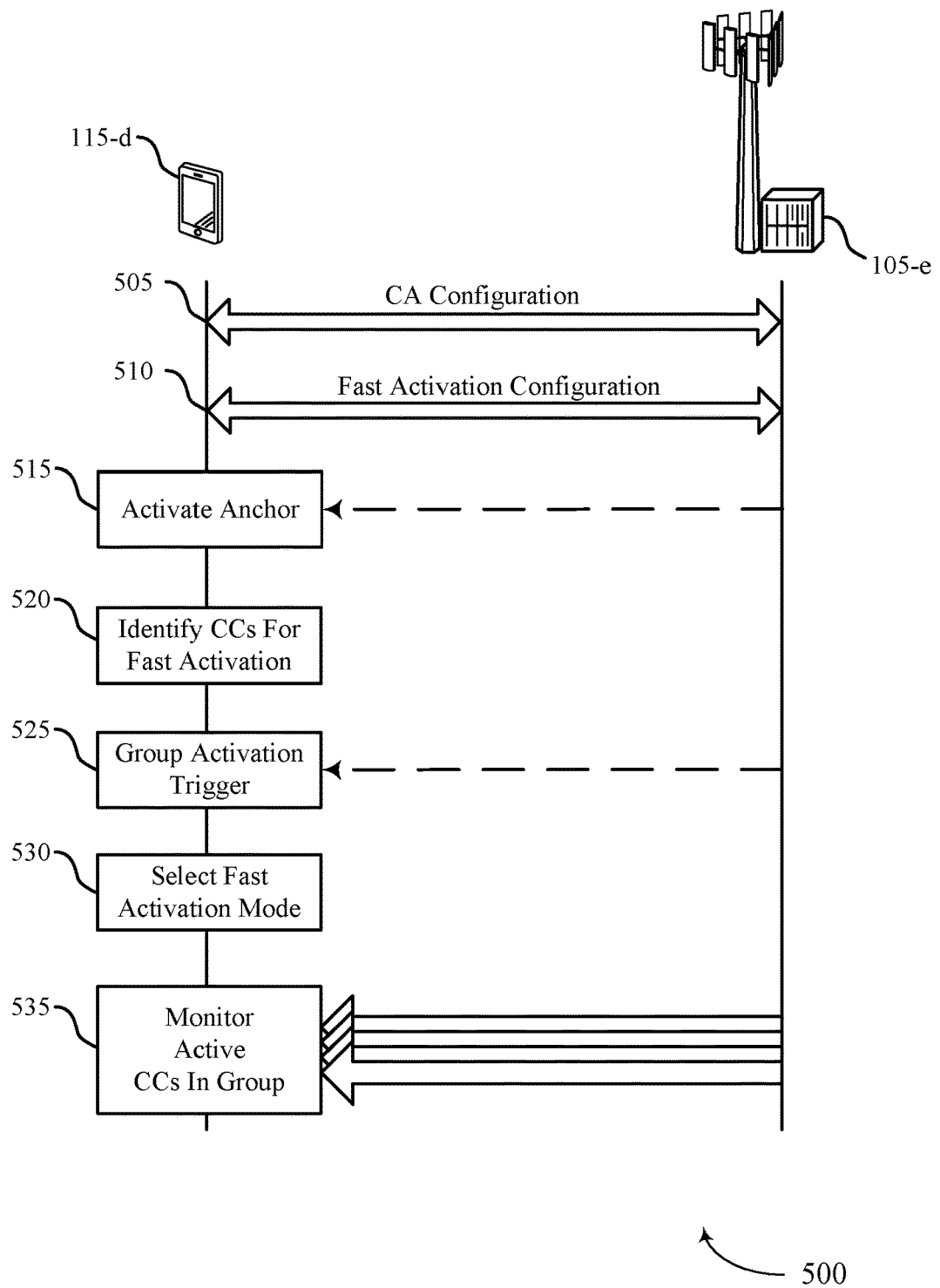

FIG. 5 illustrates an example of a process flow 500 in a system that supports eCA activation and scheduling request procedures in accordance with various aspects of the present disclosure. Process flow 500 may illustrate an example in which UE 115-d identifies one or more CCs for fast activation based on an interdependent activation group such as PUCCH group. Process flow 500 may include UE 115-d and base station 105-e, which may be examples of corresponding devices described with reference to FIGS. 1-2.

At 505, UE 115-d and base station 105-e may establish a CA or eCA configuration including a number of CCs. For example, UE 115-d may receive a CA configuration including a PCC and a PUCCH SCC, which may be an anchor carrier for an activation group.

At 510, UE 115-d and base station 105-e may establish a fast activation configuration including a fast activation mode. For example, UE 115-d may receive an indication of an activation group that may include one or more CCs associated with an anchor carrier (such as a PUCCH-enabled SCell or PUCCH SCC).

At 515, UE 115-d may activate an anchor carrier—autonomously or based on a command from base station 105-e. At 520, UE 115-d may then identify one or more CCs for fast activation based on the anchor carrier; and, in some examples, based on an indication from base station 105-e). In some cases, UE 115-d may transmit a message to base station 105-e indicating that the CCs are associated with the activation mode. In some examples, the message includes a CSI message for the CCs, a MAC layer message, an RRC message, or a measurement report.

At 525, UE 115-d may trigger an activation for some or all of the group of CCs. In some examples, triggering activation of the CCs includes receiving an activation command from base station 105-e. Additionally or alternatively, triggering activation of the CCs may include identifying a trigger condition including a channel measurement or an RRC condition, or both.

At 530, UE 115-d may determine and activation mode (e.g., select a fast activation procedure) for the one or CCs based on the group. In some examples, the activation mode includes a reduced activation period. In some cases UE 115-d may select the activation mode from a set of activation modes, such as a set including a standard activation mode associated with the standard activation period and a fast activation mode associated with the reduced activation period. In some cases, base station 105-e may also determine the activation mode for the CCs.

At 535, UE 115-d may monitor system information or control channels from base station 105-e based on the fast activation (e.g., based on the activation mode). UE 115-d and base station 105-e may then communicate using the CCs based on the activation mode.

Figure 6:
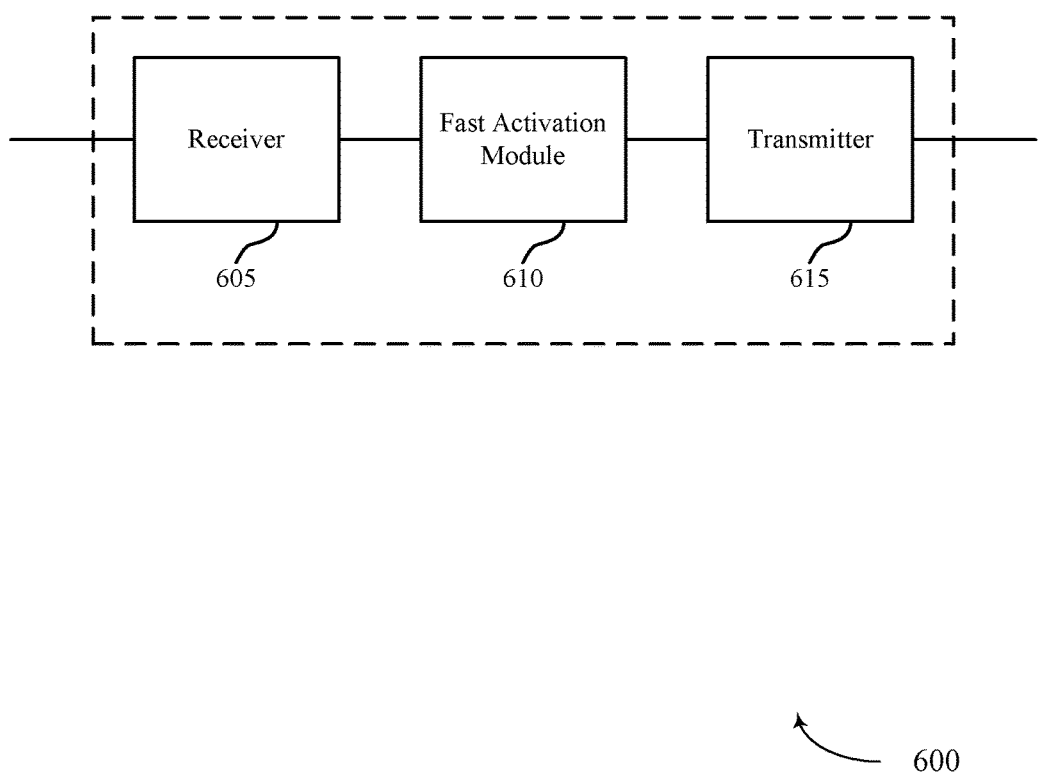
FIGS. 6-8 show block diagrams of a wireless device or devices that support eCA activation and scheduling request procedures in accordance with various aspects of the present disclosure.

FIG. 6 shows a block diagram of a wireless device 600 that supports eCA activation and scheduling request procedures in accordance with various aspects of the present disclosure. Wireless device 600 may be an example of aspects of a UE 115 described with reference to FIGS. 1-5. Wireless device 600 may include a receiver 605, a fast activation module 610, or a transmitter 615. Wireless device 600 may also include a processor. Each of these components may be in communication with one another.

The receiver 605 may receive information such as packets, user data, or control information associated with various information channels (e.g., control channels, data channels, and information related to eCA activation and scheduling request procedures, etc.). Information may be passed on to the fast activation module 610, and to other components of wireless device 600.

The fast activation module 610 may trigger activation of one or more CCs, determine an activation mode for the CCs in response to the triggering, and monitor the CCs based on the activation mode.

The transmitter 615 may transmit signals received from other components of wireless device 600. In some examples, the transmitter 615 may be collocated with the receiver 605 in a transceiver module. The transmitter 615 may include a single antenna, or it may include several antennas.

Figure 7:
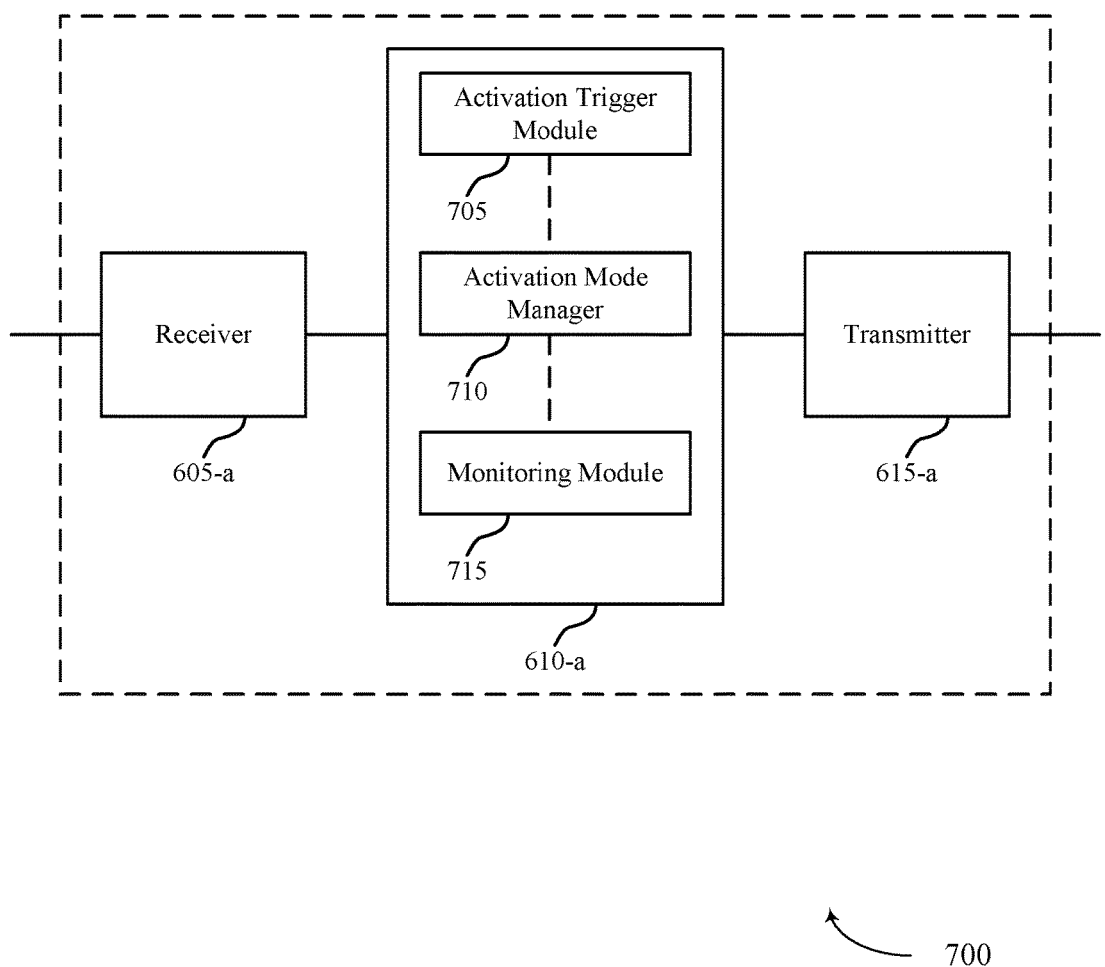

FIG. 7 shows a block diagram of a wireless device 700 that supports eCA activation and scheduling request procedures in accordance with various aspects of the present disclosure. Wireless device 700 may be an example of aspects of a wireless device 600 or a UE 115 described with reference to FIGS. 1-6. Wireless device 700 may include a receiver 605-a, a fast activation module 610-a, or a transmitter 615-*a*. Wireless device 700 may also include a processor. Each of these components may be in communication with one another. The fast activation module 610-*a* may also include an activation trigger module 705, an activation mode manager 710, and a monitoring module 715.

The receiver 605-*a* may receive information which may be passed on to fast activation module 610-*a*, and to other components of wireless device 700. The fast activation module 610-*a* may perform the operations described with reference to FIG. 6. The transmitter 615-*a* may transmit signals received from other components of wireless device 700.

The activation trigger module 705 may trigger activation of one or more CCs as described with reference to FIGS. 2-5.

The activation mode manager 710 may determine an activation mode for the CCs in response to the triggering as described with reference to FIGS. 2-5. The activation mode manager 710 may be configure or identify a reduced activation period. The activation mode manager 710 may also select the activation mode from a set of activation modes that may include, for example, a standard activation mode associated with a standard activation period and the fast activation mode associated with the reduced activation period.

The monitoring module 715 may monitor the CCs based on the activation mode as described with reference to FIGS. 2-5. In some examples, monitoring the CCs includes monitoring (e.g., blindly decoding) a control channel of the CCs or monitoring (e.g., measuring) channel information of the CCs, or both.

Figure 8:
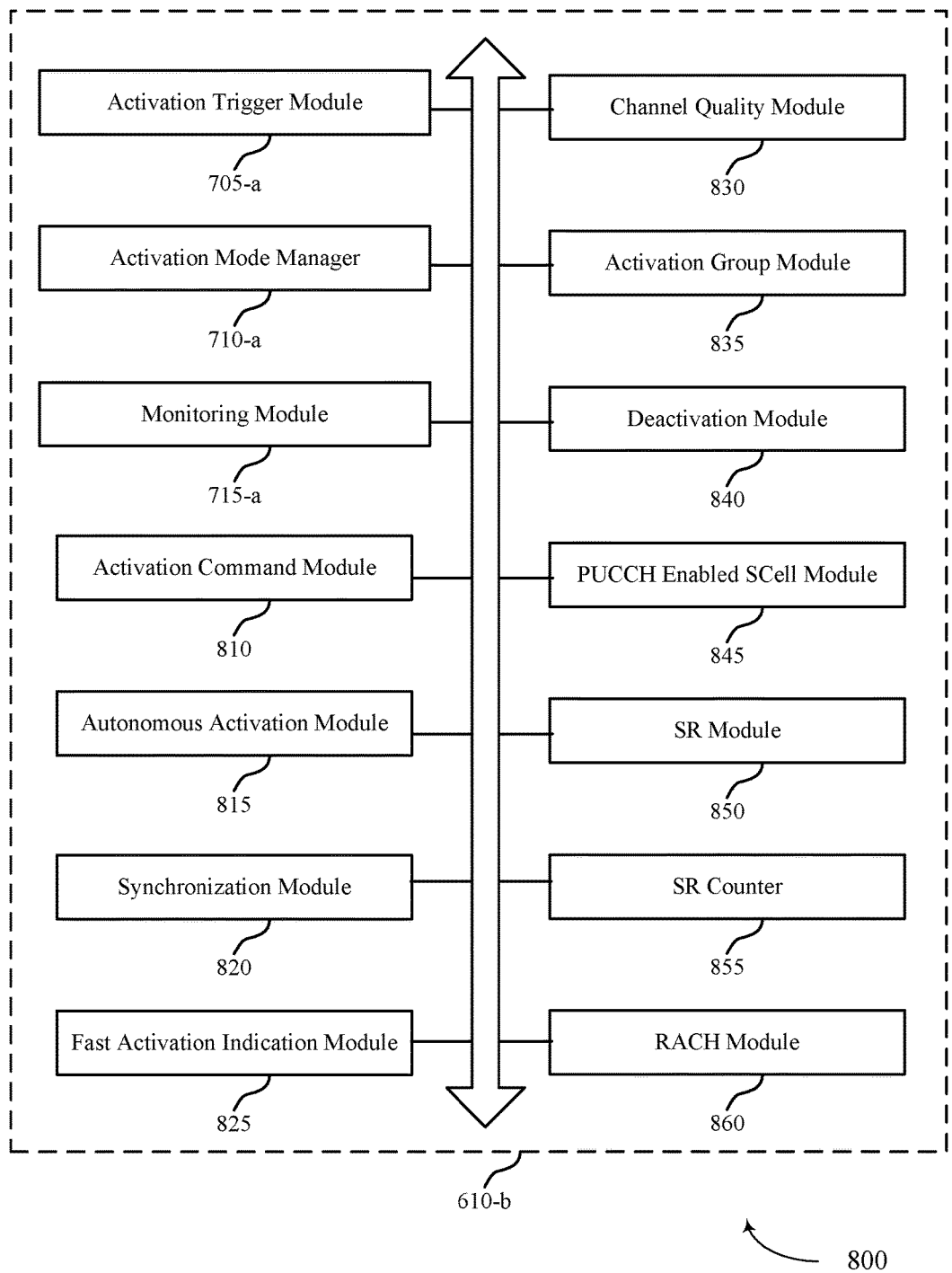

FIG. 8 shows a block diagram 800 of a fast activation module 610-*b* which may be a component of a wireless device 600 or a wireless device 700 that supports eCA activation and scheduling request procedures in accordance with various aspects of the present disclosure. The fast activation module 610-*b* may be an example of aspects of a fast activation module 610 described with reference to FIGS. 6-7. The fast activation module 610-*b* may include an activation trigger module 705-*a*, an activation mode manager 710-*a*, and a monitoring module 715-*a*. Each of these modules may perform the functions described with reference to FIG. 7. The fast activation module 610-*b* may also include an activation command module 810, an autonomous activation module 815, a synchronization module 820, a fast activation indication module 825, a channel quality module 830, an activation group module 835, a deactivation module 840, a PUCCH enabled SCell module 845, an SR module 850, an SR counter 855, and a RACH module 860.

The activation command module 810 may trigger activation of the CCs, which may be include or be based on receiving an activation command from a serving cell as described with reference to FIGS. 2-5.

The autonomous activation module 815 may enable wireless device to autonomously trigger CC activation. For example, triggering activation of the CCs may include identifying a trigger condition that includes a channel measurement or an RRC condition, or both, as described with reference to FIGS. 2-5.

The synchronization module 820 may perform a detection procedure or a synchronization procedure prior to triggering activation the CCs, which may be based on the activation mode as described with reference to FIGS. 2-5. The synchronization module 820 may also maintain synchronization with the CCs based on the deactivation mode.

The fast activation indication module 825 may transmit an indication that the CCs are associated with the activation mode as described with reference to FIGS. 2-5. In some examples, the message includes a CSI message for the CCs, a MAC layer message, an RRC message, or a measurement report, or any combination thereof.

The channel quality module 830 may measure a channel quality of the CCs, and determining the activation mode for the CCs may be based on the measured channel quality as described with reference to FIGS. 2-5.

The activation group module 835 may identify an activated CC (i.e., an anchor carrier of an activation group), and determining the activation mode may be based on the activated CC as described with reference to FIGS. 2-5. The activation group module 835 may also receive an indication of an activation group including the CCs; identifying the CCs may thus be based on the activation group. In some cases, the activation group module 835 may also activate an anchor carrier for the wireless device, and determining the activation mode may be based on activating the anchor carrier.

The deactivation module 840 may trigger deactivation of the CCs as described with reference to FIGS. 2-5. The deactivation module 840 may also determine a deactivation mode.

The PUCCH enabled SCell module 845 may receive a CA configuration that includes a PCC and a PUCCH SCC as described with reference to FIGS. 2-5. The PUCCH enabled SCell module 845 may also transmit an SR on the PUCCH SCC based on the determination.

The SR module 850 may receive an SR configuration that includes an SR transmission threshold for the PCC and the PUCCH SCC as described with reference to FIGS. 2-5. The SR configuration may be received on the primary CC or the secondary CC with a PUCCH, or both. In some examples, the SR configuration includes a common or single SR threshold, which may be associated with a counter for the PCC or the PUCCH SCC, or both.

The SR counter 855 may determine that an SR count is less than the SR transmission threshold as described with reference to FIGS. 2-5. The SR counter 855 may also determine that an SR count is greater than the SR transmission threshold. Upon determining that the SR counter 855 is greater than the threshold (e.g., the SR count has exceed the threshold), the SR counter 855 may cause PUCCH or SRS resources, or both, to be released. In some examples, the SR configuration is associated with one SR counter for the PCC and a second SR counter for the PUCCH SCC.

The RACH module 860 may initiate a RACH procedure based on the determination as described with reference to FIGS. 2-5.

Figure 9:
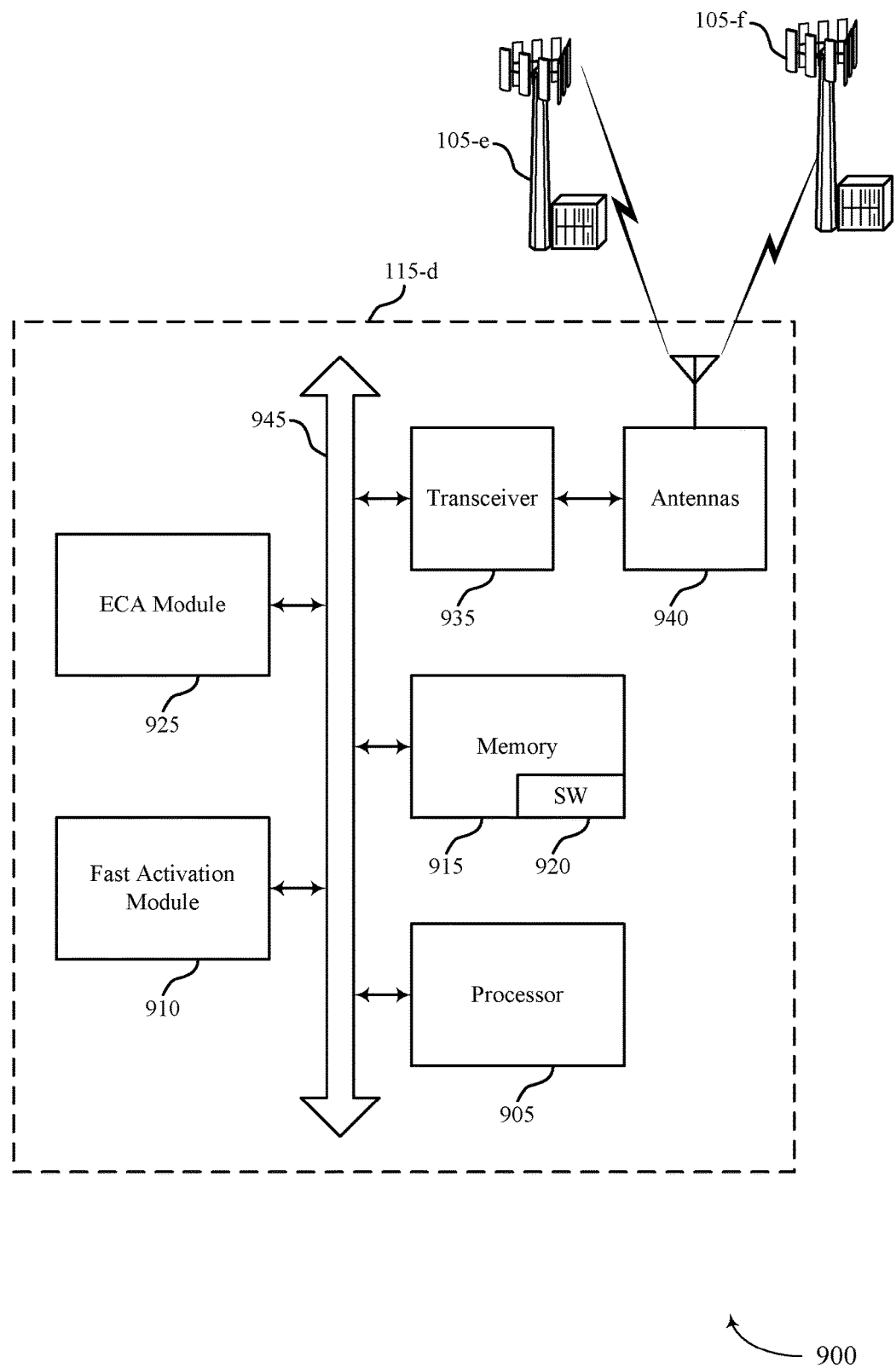
FIG. 9 illustrates a block diagram of a system including a UE that supports eCA activation and scheduling request procedures in accordance with various aspects of the present disclosure.

FIG. 9 shows a diagram of a system 900 including a UE 115 configured that supports eCA activation and scheduling request procedures in accordance with various aspects of the present disclosure. System 900 may include UE 115-*d*, which may be an example of a wireless device 600, a wireless device 700, or a UE 115 described with reference to FIGS. 1, 2 and 6-8. UE 115-*d* may include a fast activation module 910, which may be an example of a fast activation module 610 described with reference to FIGS. 6-8. UE 115-*d* may also include an eCA module 925. UE 115-*d* may also include components for bi-directional voice and data communications including components for transmitting communications and components for receiving communications. For example, UE 115-*d* may communicate bi-directionally with base station 105-*e* or base station 105-*f*.

ECA module 925 may perform eCA operations as described above such as coordinating communications for a large number of CCs, communications over unlicensed spectrum, or communication with one or more eCCS.

UE 115-*d* may also include a processor 905, and memory 915 (including software (SW) 920), a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-*d* may include a single antenna 940, UE 115-*d* may also have multiple antennas 940 capable of concurrently transmitting or receiving multiple wireless transmissions.

The memory 915 may include RAM and ROM. The memory 915 may store computer-readable, computer-executable software/firmware code 920 including instructions that, when executed, cause the processor 905 to perform various functions described herein (e.g., eCA activation and scheduling request procedures, etc.). Alternatively, the software/firmware code 920 may not be directly executable by the processor 905 but cause a computer (e.g., when compiled and executed) to perform functions described herein. The processor 905 may include an intelligent hardware device, (e.g., a CPU, a microcontroller, an ASIC, etc.)

Figure 10:
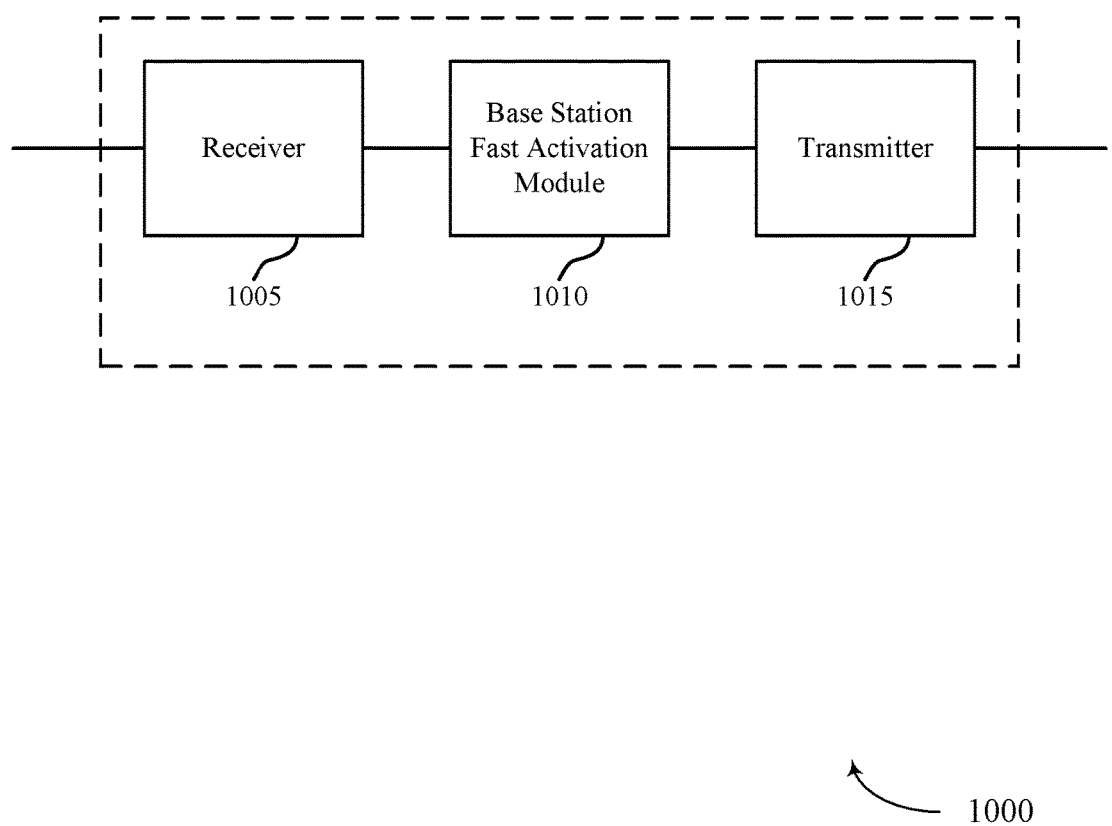
FIGS. 10-12 show block diagrams of a wireless device or devices that support eCA activation and scheduling request procedures in accordance with various aspects of the present disclosure.

FIG. 10 shows a block diagram of a wireless device 1000 that supports eCA activation and scheduling request procedures in accordance with various aspects of the present disclosure. Wireless device 1000 may be an example of aspects of a base station 105 described with reference to FIGS. 1-9. Wireless device 1000 may include a receiver 1005, a base station fast activation module 1010, or a transmitter 1015. Wireless device 1000 may also include a processor. Each of these components may be in communication with each other.

The receiver 1005 may receive information such as packets, user data, or control information associated with various information channels (e.g., control channels, data channels, and information related to eCA activation and scheduling request procedures, etc.). Information may be passed on to the base station fast activation module 1010, and to other components of wireless device 1000. In some examples, the receiver 1005 may receive a message from the wireless device indicating the one or more CCs, and determining the activation mode may be based on the message.

The base station fast activation module 1010 may transmit an activation message to a wireless device for one or more CCs, determine an activation mode for the CCs, and communicate with the wireless device using the CCs based on the activation mode.

The transmitter 1015 may transmit signals received from other components of wireless device 1000. In some examples, the transmitter 1015 may be collocated with the receiver 1005 in a transceiver module. The transmitter 1015 may include a single antenna, or it may include several antennas.

Figure 11:
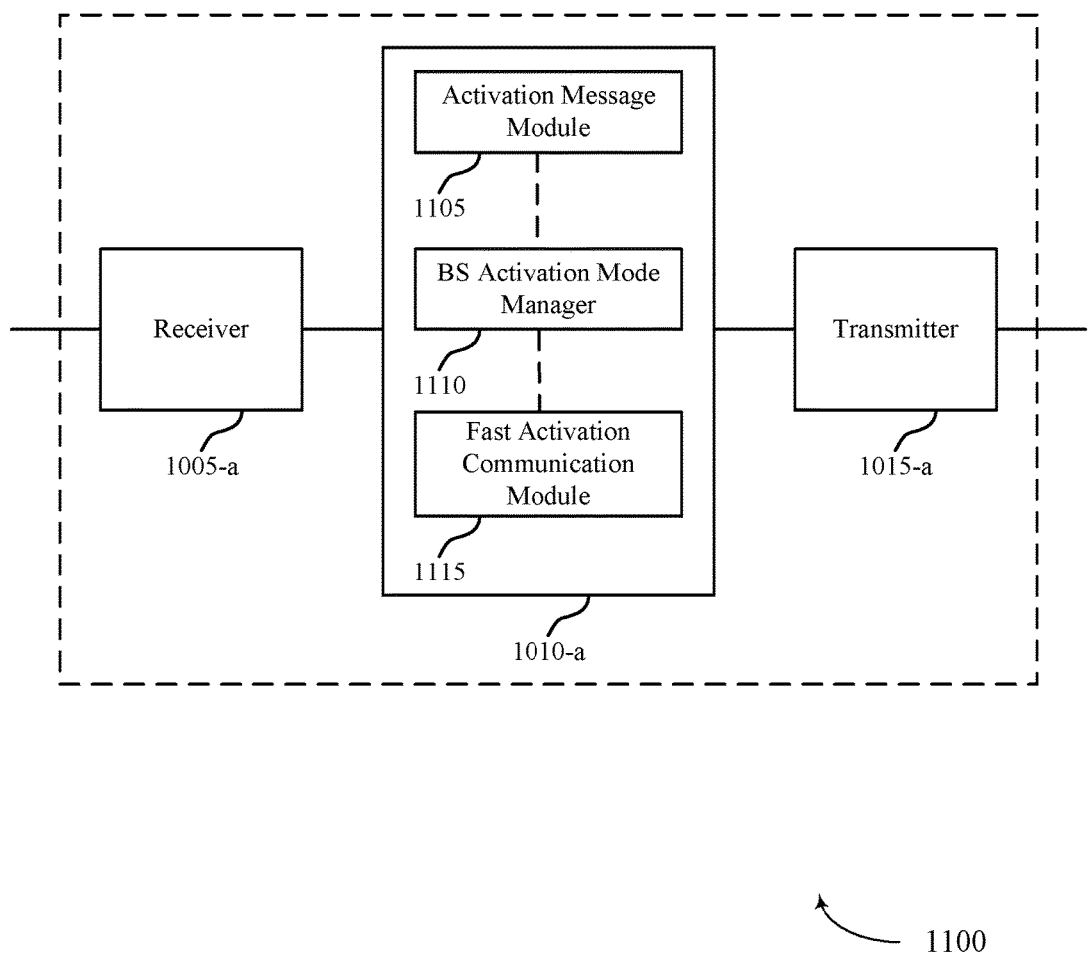

FIG. 11 shows a block diagram of a wireless device 1100 that supports eCA activation and scheduling request procedures in accordance with various aspects of the present disclosure. Wireless device 1100 may be an example of aspects of a wireless device 1000 or a base station 105 described with reference to FIGS. 1-10. Wireless device 1100 may include a receiver 1005-*a*, a base station fast activation module 1010-*a*, or a transmitter 1015-*a*. Wireless device 1100 may also include a processor. Each of these components may be in communication with one another. The base station fast activation module 1010-*a* may also include an activation message module 1105, a BS activation mode manager 1110, and a fast activation communication module 1115.

The receiver 1005-*a* may receive information, which may be passed on to base station fast activation module 1010-*a*, and to other components of wireless device 1000. The base station fast activation module 1010-*a* may perform the operations described with reference to FIG. 10. The transmitter 1015-*a* may transmit signals received from other components of wireless device 1100.

The activation message module 1105 may transmit an activation message to a wireless device for one or more CCs as described with reference to FIGS. 2-5.

The BS activation mode manager 1110 may determine an activation mode for the CCs as described with reference to FIGS. 2-5.

The fast activation communication module 1115 may communicate with the wireless device using the CCs based on the activation mode as described with reference to FIGS. 2-5.

Figure 12:
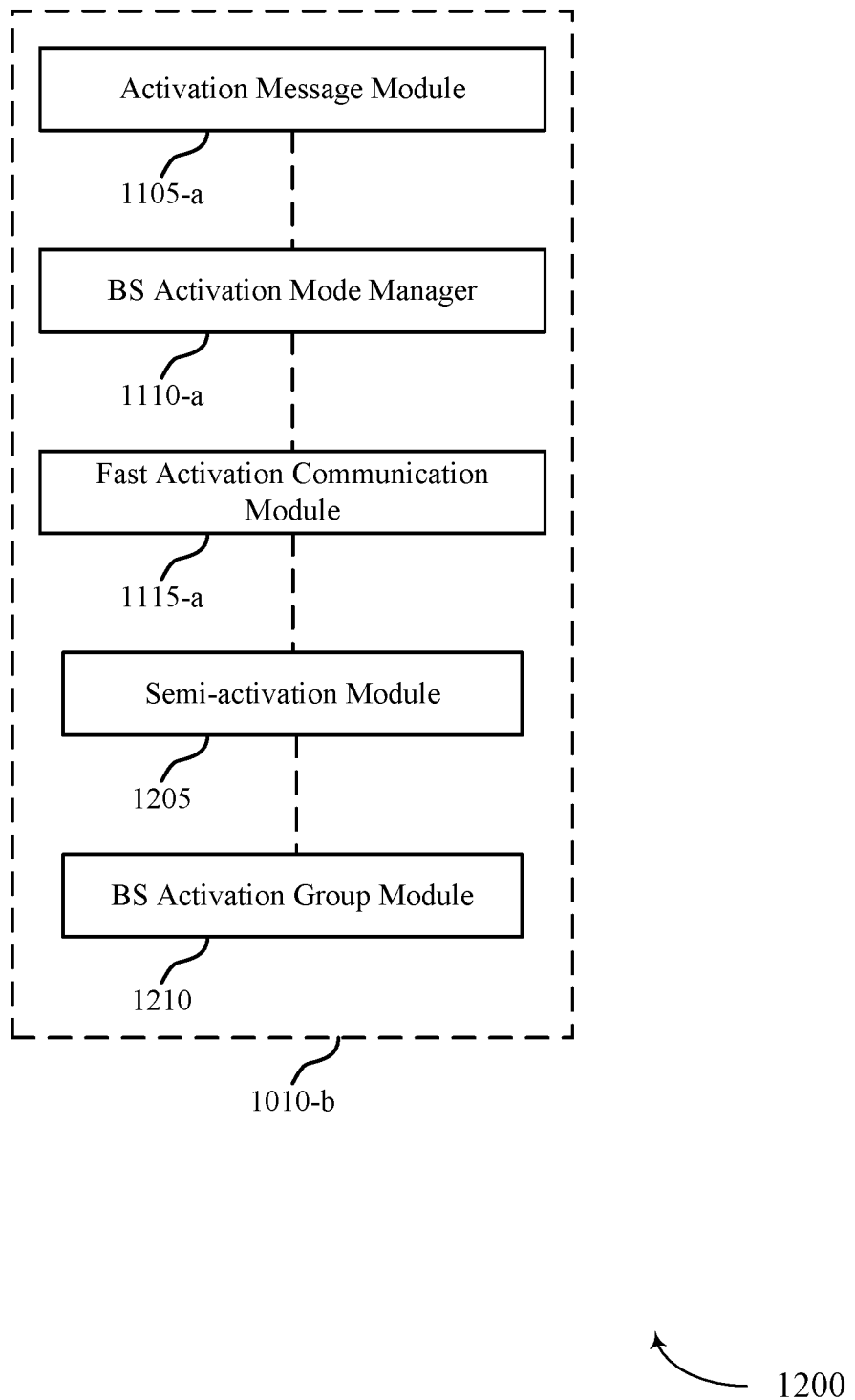

FIG. 12 shows a block diagram 1200 of a base station fast activation module 1010-*b* which may be a component of a wireless device 1000 or a wireless device 1100 for eCA activation and scheduling request procedures in accordance with various aspects of the present disclosure. The base station fast activation module 1010-*b* may be an example of aspects of a base station fast activation module 1010 described with reference to FIGS. 10-11. The base station fast activation module 1010-*b* may include an activation message module 1105-*a*, a BS activation mode manager 1110-*a*, and a fast activation communication module 1115-*a*. Each of these modules may perform the functions described with reference to FIG. 11. The base station fast activation module 1010-*b* may also include a semi-activation module 1205, and a BS activation group module 1210.

The semi-activation module 1205 may transmit a semi-activation signal to the wireless device, and determining the activation mode may be based on the semi-activation signal as described with reference to FIGS. 2-5.

The BS activation group module 1210 may transmit an indication of an activation group to the wireless device, where the activation group may include the CCs and determining the activation mode may be based on the activation group as described with reference to FIGS. 2-5.

Figure 13:
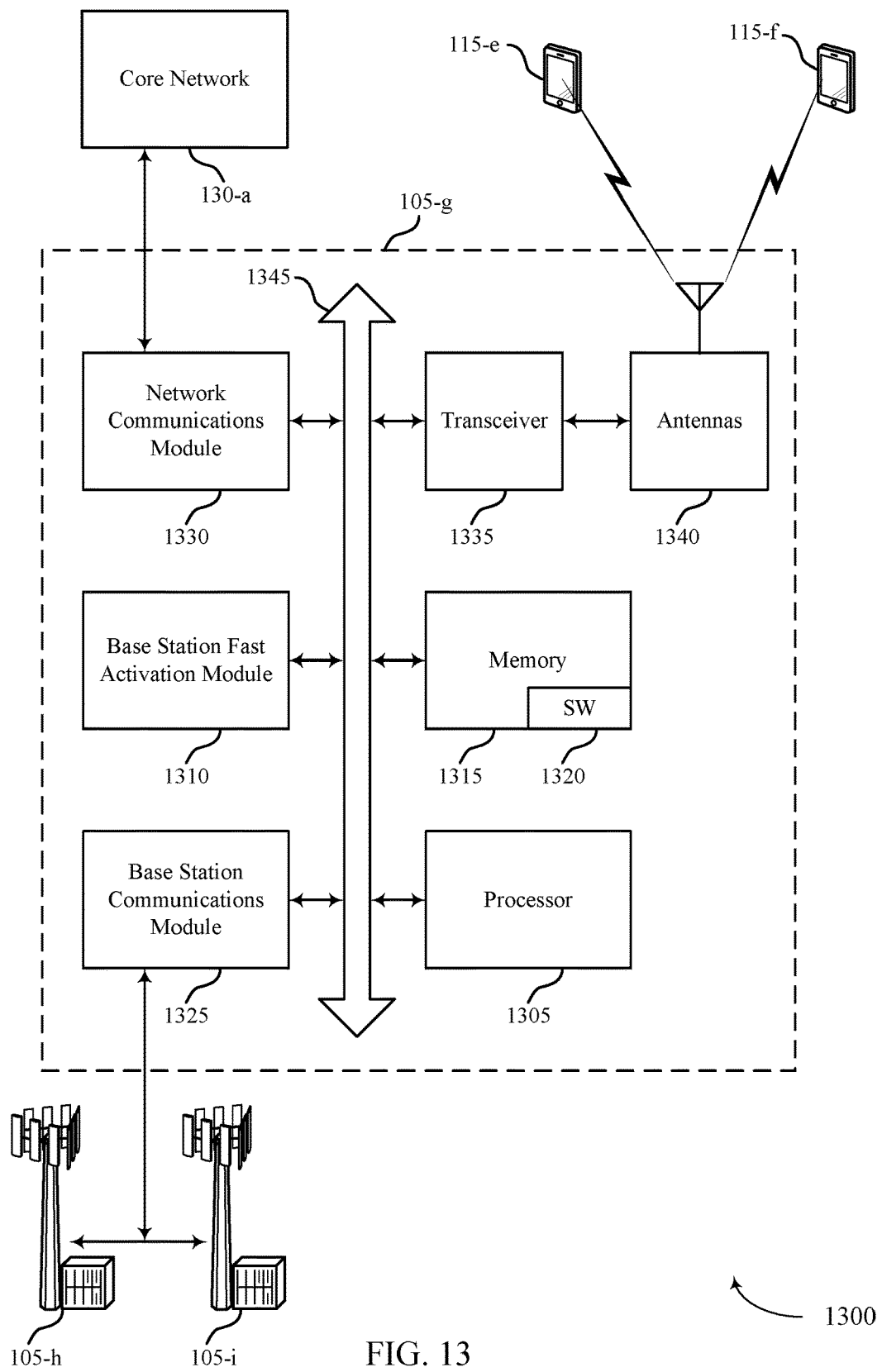
FIG. 13 illustrates a block diagram of a system including a base station that supports eCA activation and scheduling request procedures in accordance with various aspects of the present disclosure.

FIG. 13 shows a diagram of a system 1300 including a base station 105 configured for eCA activation and scheduling request procedures in accordance with various aspects of the present disclosure. System 1300 may include base station 105-*g*, which may be an example of a wireless device 1000, a wireless device 1100, or a base station 105 described with reference to FIGS. 1, 2, and 10-12. Base Station 105-*g* may include a base station fast activation module 1310, which may be an example of a base station fast activation module 1010 described with reference to FIGS. 10-12. Base Station 105-*g* may also include components for bi-directional voice and data communications including components for transmitting communications and components for receiving communications. For example, base station 105-*g* may communicate bi-directionally with UE 115-*e* or UE 115-*f*.

In some cases, base station 105-g may have one or more wired backhaul links. Base station 105-g may have a wired backhaul link (e.g., S1 interface, etc.) to the core network 130. Base station 105-g may also communicate with other base stations 105, such as base station 105-h and base station 105-i via inter-base station backhaul links (e.g., an X2 interface). Each of the base stations 105 may communicate with UEs 115 using the same or different wireless communications technologies. In some cases, base station 105-g may communicate with other base stations such as 105-h or 105-i utilizing base station communication module 1325. In some examples, base station communication module 1325 may provide an X2 interface within an LTE/LTE-A wireless communication network technology to provide communication between some of the base stations 105. In some examples, base station 105-g may communicate with other base stations through core network 130. In some cases, base station 105-g may communicate with the core network 130 through network communications module 1330.

The base station 105-g may include a processor 1305, memory 1315 (including software (SW) 1320), transceiver 1335, and antenna(s) 1340, which each may be in communication, directly or indirectly, with one another (e.g., over bus system 1345). The transceivers 1335 may be configured to communicate bi-directionally, via the antenna(s) 1340, with the UEs 115, which may be multi-mode devices. The transceiver 1335 (or other components of the base station 105-g) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-g may include multiple transceivers 1335, each with one or more associated antennas 1340. The transceiver may be an example of a combined receiver 1005 and transmitter 1015 of FIG. 10.

The memory 1315 may include RAM and ROM. The memory 1315 may also store computer-readable, computer-executable software/firmware code 1320 containing instructions that are configured to, when executed, cause the processor 1305 to perform various functions described herein (e.g., eCA activation and scheduling request procedures, selecting coverage enhancement techniques, call processing, database management, message routing, etc.). Alternatively, the software/firmware code 1320 may not be directly executable by the processor 1305 but be configured to cause the computer, e.g., when compiled and executed, to perform functions described herein. The processor 1305 may include an intelligent hardware device, e.g., a CPU, a microcontroller, an ASIC, etc. The processor 1305 may include various special purpose processors such as encoders, queue processing modules, base band processors, radio head controllers, DSPs, and the like.

The base station communication module 1325 may manage communications with other base stations 105. In some cases, a communications management module may include a controller or scheduler for controlling communications with UEs 115 in cooperation with other base stations 105. For example, the base station communication module 1325 may coordinate scheduling for transmissions to UEs 115 for various interference mitigation techniques such as beamforming or joint transmission.

The components of wireless device 600, wireless device 700, fast activation module 610, system 900, wireless device 1000, wireless device 1100, base station fast activation module 1010, and system 1300 may each, individually or collectively, be implemented with at least one application specific integrated circuit (ASIC) adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, an field-programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 14:
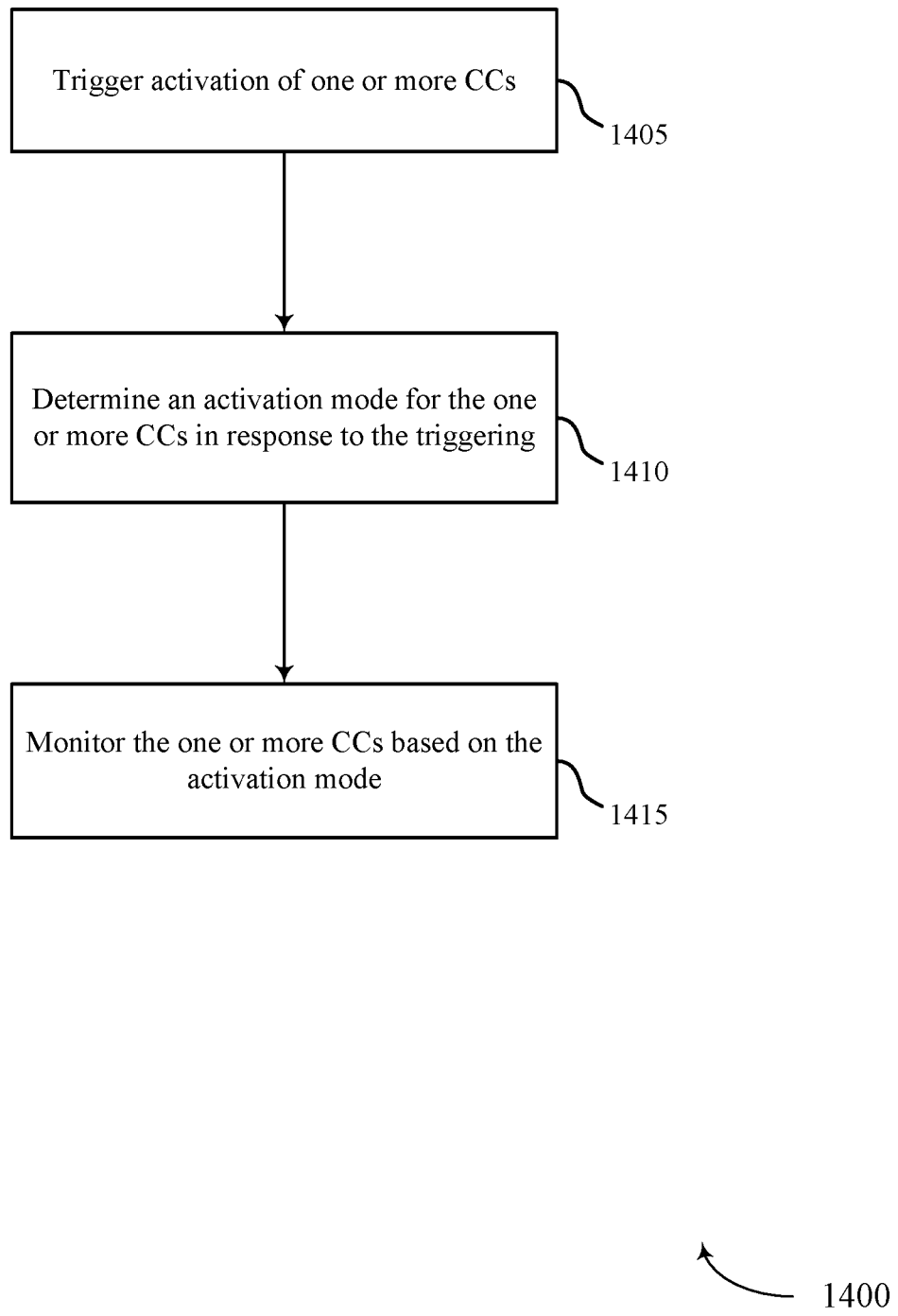
FIGS. 14-21 illustrate methods for eCA activation and scheduling request procedures in accordance with various aspects of the present disclosure.

FIG. 14 shows a flowchart illustrating a method 1400 for eCA activation and scheduling request procedures in accordance with various aspects of the present disclosure. The operations of method 1400 may be implemented by a UE 115 or its components as described with reference to FIGS. 1-13. For example, the operations of method 1400 may be performed by the fast activation module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware.

At block 1405, the UE 115 may trigger activation of one or more CCs as described with reference to FIGS. 2-5. In certain examples, the operations of block 1405 may be performed by the activation trigger module 705 as described with reference to FIG. 7.

At block 1410, the UE 115 may determine an activation mode for the CCs in response to the triggering as described with reference to FIGS. 2-5. In certain examples, the operations of block 1410 may be performed by the activation mode manager 710 as described with reference to FIG. 7.

At block 1415, the UE 115 may monitor the CCs based on the activation mode as described with reference to FIGS. 2-5. In certain examples, the operations of block 1415 may be performed by the monitoring module 715 as described with reference to FIG. 7.

Figure 15:
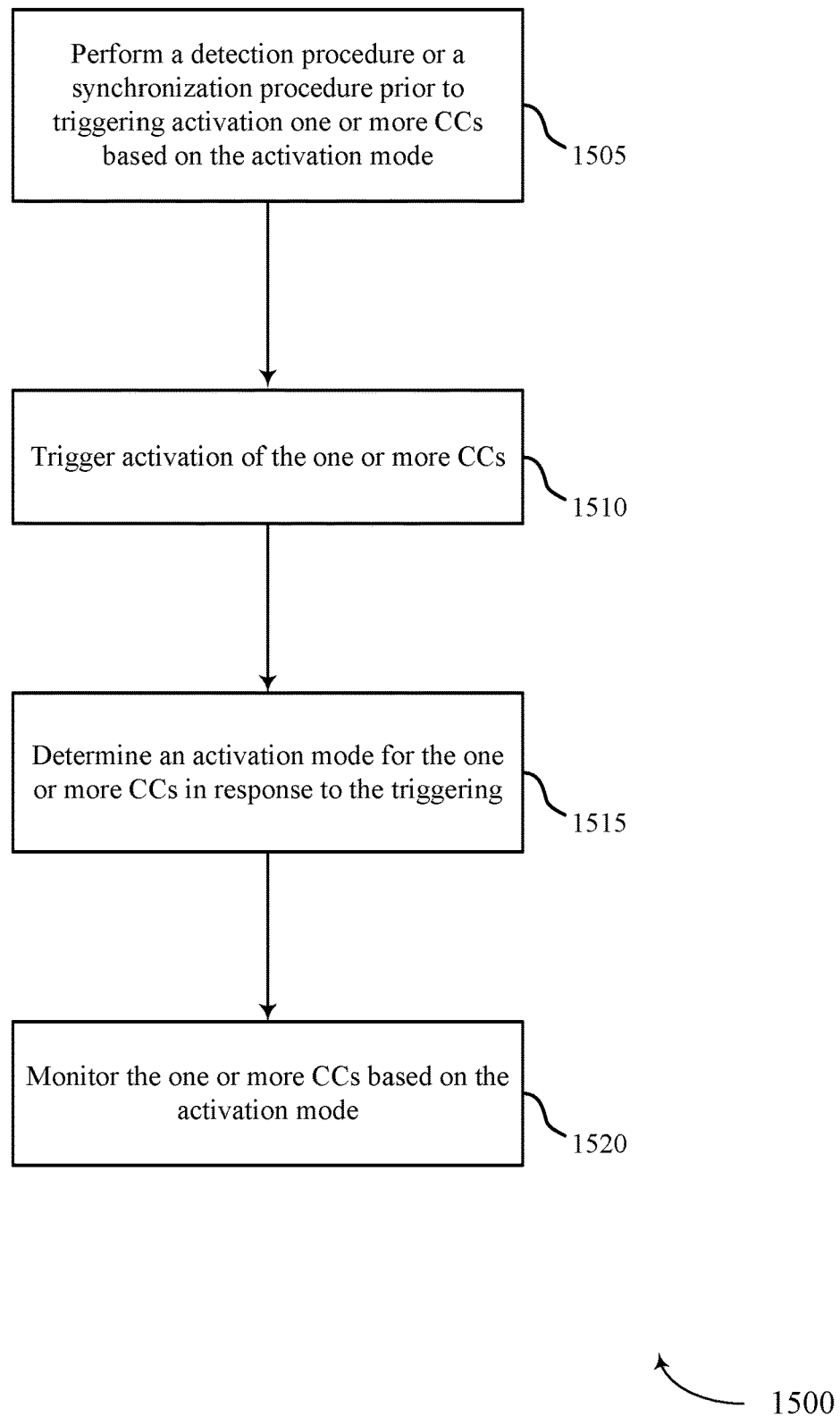

FIG. 15 shows a flowchart illustrating a method 1500 for eCA activation and scheduling request procedures in accordance with various aspects of the present disclosure. The operations of method 1500 may be implemented by a UE 115 or its components as described with reference to FIGS. 1-13. For example, the operations of method 1500 may be performed by the fast activation module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of method 1400 of FIG. 14.

At block 1505, the UE 115 may perform a detection procedure or a synchronization procedure prior to triggering activation one or more CCs based on the activation mode as described with reference to FIGS. 2-5. In certain examples, the operations of block 1505 may be performed by the synchronization module 820 as described with reference to FIG. 8.

At block 1510, the UE 115 may trigger activation of the CCs as described with reference to FIGS. 2-5. In certain examples, the operations of block 1510 may be performed by the activation trigger module 705 as described with reference to FIG. 7.

At block 1515, the UE 115 may determine an activation mode for the CCs in response to the triggering as described with reference to FIGS. 2-5. In certain examples, the operations of block 1515 may be performed by the activation mode manager 710 as described with reference to FIG. 7.

At block 1520, the UE 115 may monitor the CCs based on the activation mode as described with reference to FIGS. 2-5. In certain examples, the operations of block 1520 may be performed by the monitoring module 715 as described with reference to FIG. 7.

Figure 16:
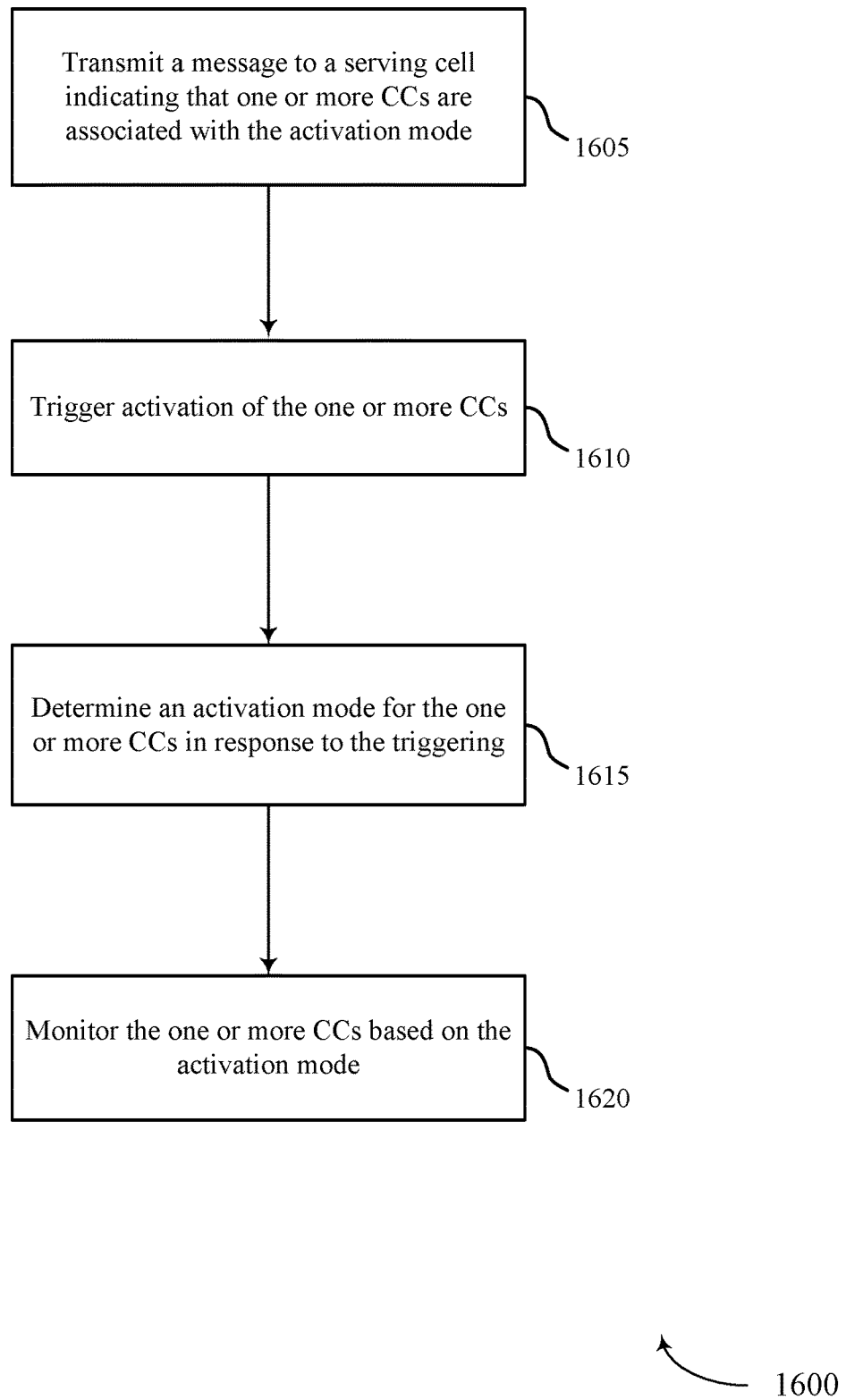

FIG. 16 shows a flowchart illustrating a method 1600 for eCA activation and scheduling request procedures in accordance with various aspects of the present disclosure. The operations of method 1600 may be implemented by a UE 115 or its components as described with reference to FIGS. 1-13. For example, the operations of method 1600 may be performed by the fast activation module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1400, and 1500 of FIGS. 14-15.

At block 1605, the UE 115 may transmit an indication that CCs are associated with the activation mode as described with reference to FIGS. 2-5. In certain examples, the operations of block 1605 may be performed by the fast activation indication module 825 as described with reference to FIG. 8.

At block 1610, the UE 115 may trigger activation of the CCs as described with reference to FIGS. 2-5. In certain examples, the operations of block 1610 may be performed by the activation trigger module 705 as described with reference to FIG. 7.

At block 1615, the UE 115 may determine an activation mode for the CCs in response to the triggering as described with reference to FIGS. 2-5. In certain examples, the operations of block 1615 may be performed by the activation mode manager 710 as described with reference to FIG. 7.

At block 1620, the UE 115 may monitor the CCs based on the activation mode as described with reference to FIGS. 2-5. In certain examples, the operations of block 1620 may be performed by the monitoring module 715 as described with reference to FIG. 7.

Figure 17:
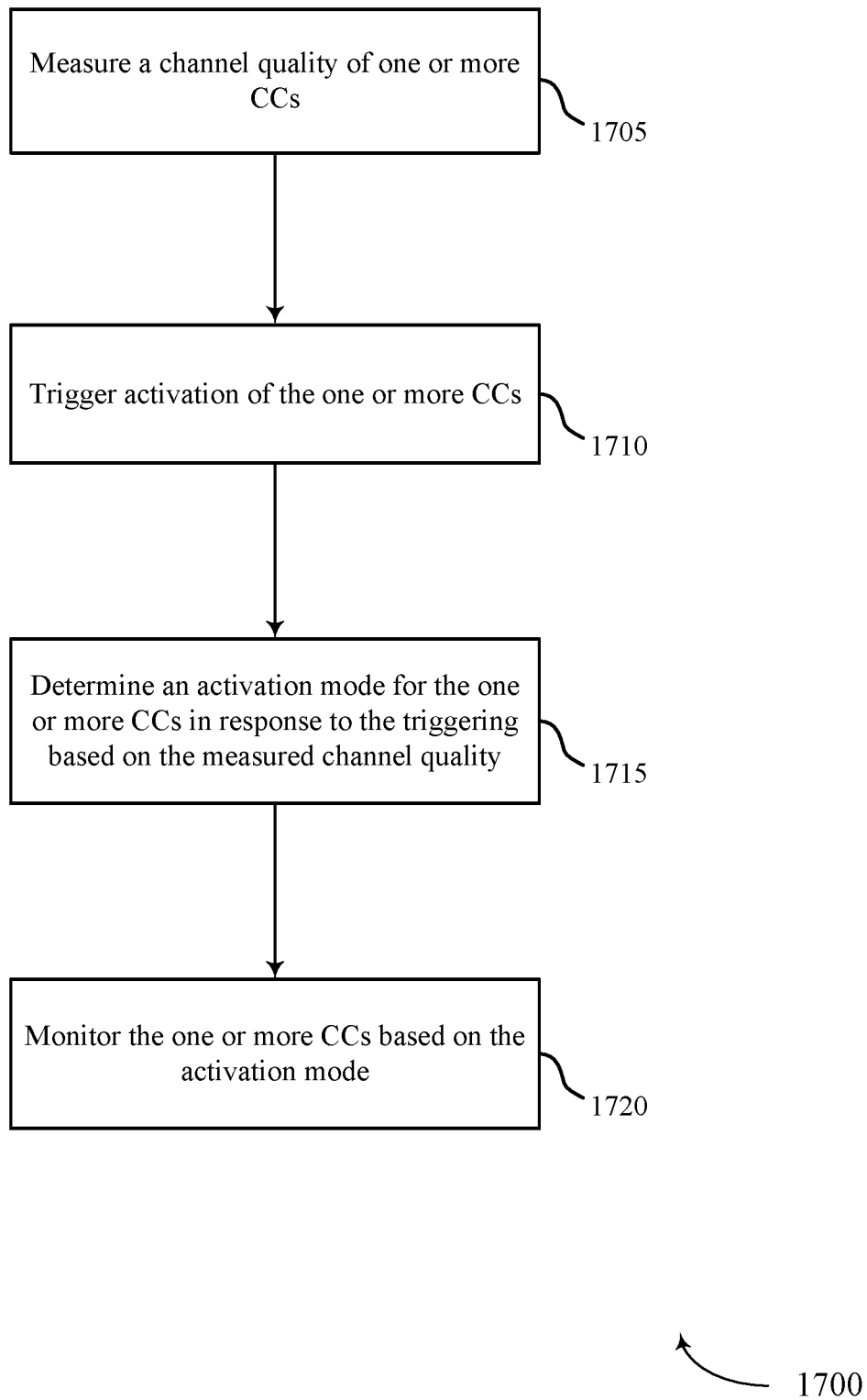

FIG. 17 shows a flowchart illustrating a method 1700 for eCA activation and scheduling request procedures in accordance with various aspects of the present disclosure. The operations of method 1700 may be implemented by a UE 115 or its components as described with reference to FIGS. 1-13. For example, the operations of method 1700 may be performed by the fast activation module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1700 may also incorporate aspects of methods 1400, 1500, and 1600 of FIGS. 14-16.

At block 1705, the UE 115 may measure a channel quality of the CCs, where determining the activation mode for the CCs may be based on the measured channel quality as described with reference to FIGS. 2-5. In certain examples, the operations of block 1705 may be performed by the channel quality module 830 as described with reference to FIG. 8.

At block 1710, the UE 115 may trigger activation of one or more CCs as described with reference to FIGS. 2-5. In certain examples, the operations of block 1710 may be performed by the activation trigger module 705 as described with reference to FIG. 7.

At block 1715, the UE 115 may determine an activation mode for the CCs in response to the triggering as described with reference to FIGS. 2-5. In certain examples, the operations of block 1715 may be performed by the activation mode manager 710 as described with reference to FIG. 7.

At block 1720, the UE 115 may monitor the CCs based on the activation mode as described with reference to FIGS. 2-5. In certain examples, the operations of block 1720 may be performed by the monitoring module 715 as described with reference to FIG. 7.

Figure 18:
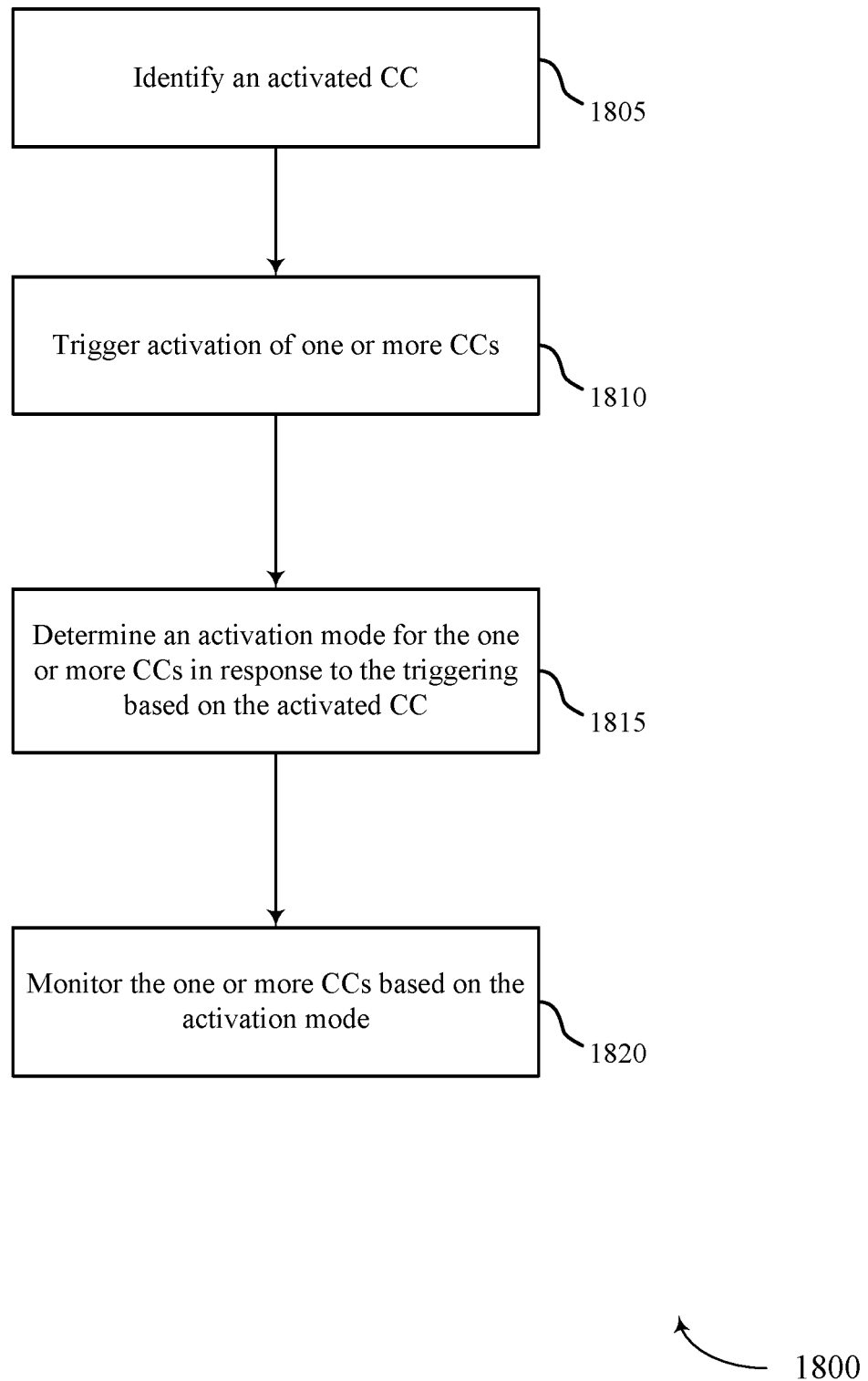

FIG. 18 shows a flowchart illustrating a method 1800 for eCA activation and scheduling request procedures in accordance with various aspects of the present disclosure. The operations of method 1800 may be implemented by a UE 115 or its components as described with reference to FIGS. 1-13. For example, the operations of method 1800 may be performed by the fast activation module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1800 may also incorporate aspects of methods 1400, 1500, 1600, and 1700 of FIGS. 14-17.

At block 1805, the UE 115 may identify an activated CC, and determining the activation mode may be based on the activated CC as described with reference to FIGS. 2-5. In certain examples, the operations of block 1805 may be performed by the activation group module 835 as described with reference to FIG. 8.

At block 1810, the UE 115 may trigger activation of one or more CCs as described with reference to FIGS. 2-5. In certain examples, the operations of block 1810 may be performed by the activation trigger module 705 as described with reference to FIG. 7.

At block 1815, the UE 115 may determine an activation mode for the CCs in response to the triggering as described with reference to FIGS. 2-5. In certain examples, the operations of block 1815 may be performed by the activation mode manager 710 as described with reference to FIG. 7.

At block 1820, the UE 115 may monitor the CCs based on the activation mode as described with reference to FIGS. 2-5. In certain examples, the operations of block 1820 may be performed by the monitoring module 715 as described with reference to FIG. 7.

Figure 19:
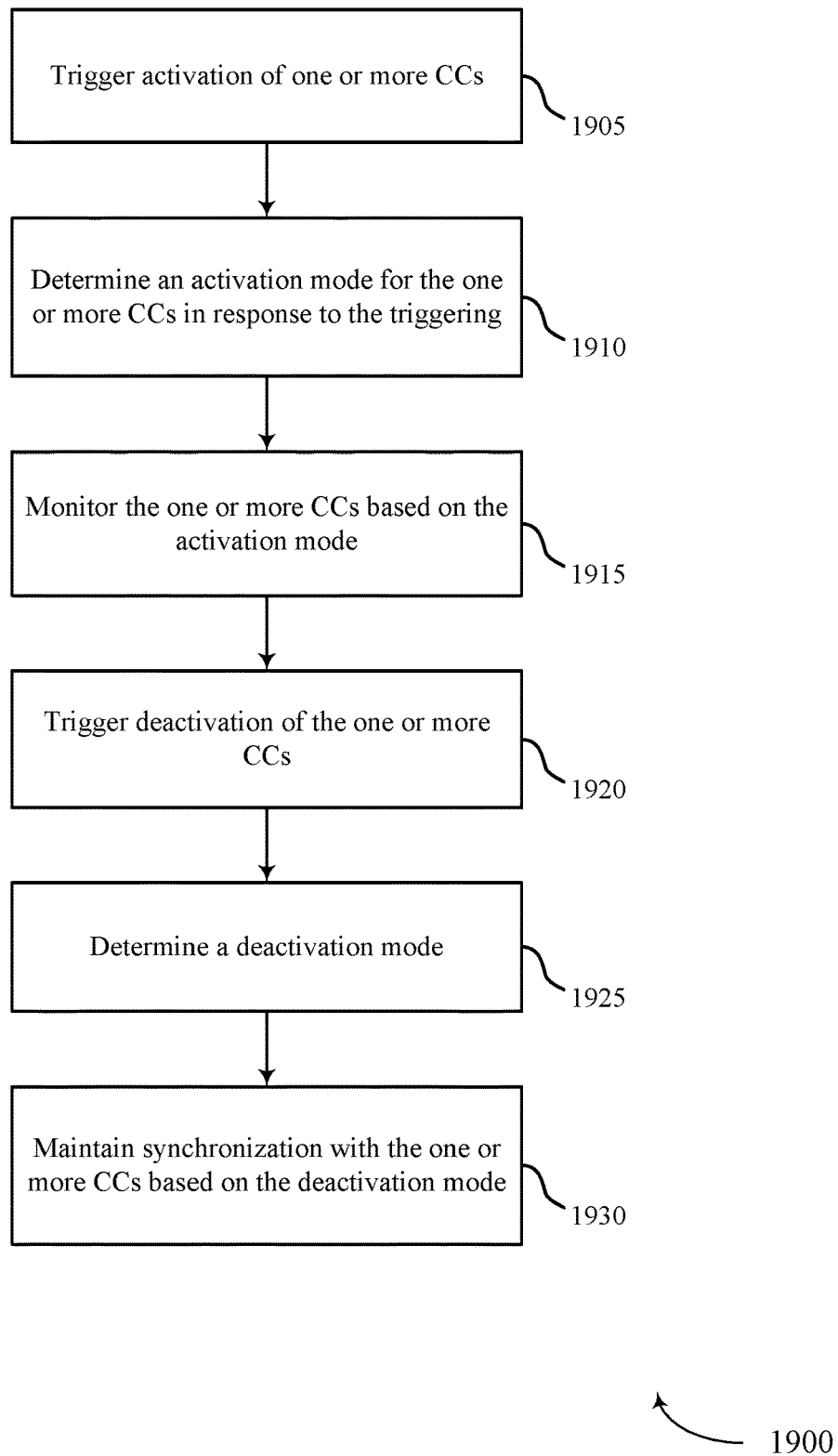

FIG. 19 shows a flowchart illustrating a method 1900 for eCA activation and scheduling request procedures in accordance with various aspects of the present disclosure. The operations of method 1900 may be implemented by a UE 115 or its components as described with reference to FIGS. 1-13. For example, the operations of method 1900 may be performed by the fast activation module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 1900 may also incorporate aspects of methods 1400, 1500, 1600, 1700, and 1800 of FIGS. 14-18.

At block 1905, the UE 115 may trigger activation of one or more CCs as described with reference to FIGS. 2-5. In certain examples, the operations of block 1905 may be performed by the activation trigger module 705 as described with reference to FIG. 7.

At block 1910, the UE 115 may determine an activation mode for the CCs in response to the triggering as described with reference to FIGS. 2-5. In certain examples, the operations of block 1910 may be performed by the activation mode manager 710 as described with reference to FIG. 7.

At block 1915, the UE 115 may monitor the CCs based on the activation mode as described with reference to FIGS. 2-5. In certain examples, the operations of block 1915 may be performed by the monitoring module 715 as described with reference to FIG. 7.

At block 1920, the UE 115 may trigger deactivation of the CCs as described with reference to FIGS. 2-5. In certain examples, the operations of block 1920 may be performed by the deactivation module 840 as described with reference to FIG. 8.

At block 1925, the UE 115 may determine a deactivation mode as described with reference to FIGS. 2-5. In certain examples, the operations of block 1925 may be performed by the deactivation module 840 as described with reference to FIG. 8.

At block 1930, the UE 115 may maintain synchronization with the CCs based on the deactivation mode as described with reference to FIGS. 2-5. In certain examples, the operations of block 1930 may be performed by the synchronization module 820 as described with reference to FIG. 8.

Figure 20:
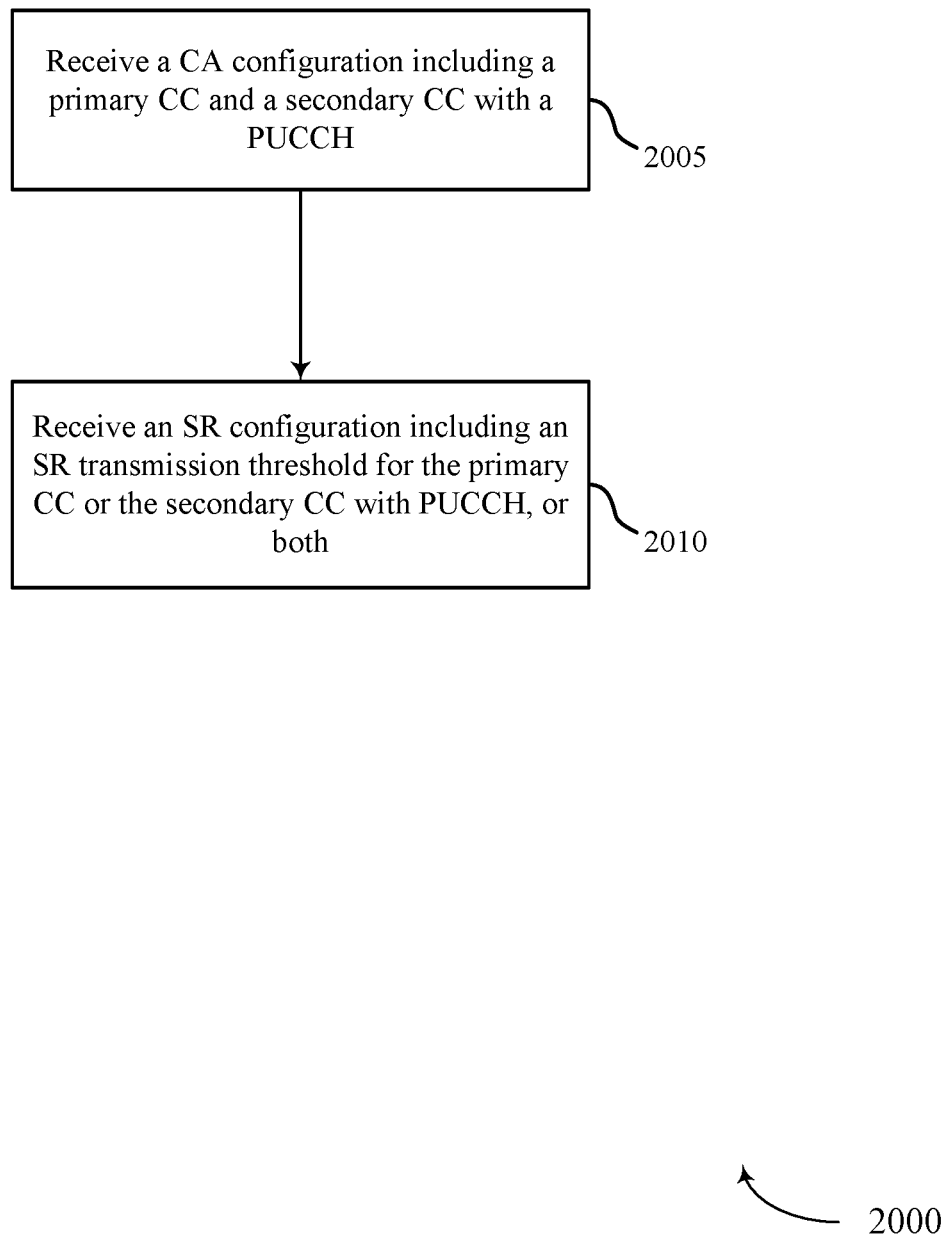

FIG. 20 shows a flowchart illustrating a method 2000 for eCA activation and scheduling request procedures in accordance with various aspects of the present disclosure. The operations of method 2000 may be implemented by a UE 115 or its components as described with reference to FIGS. 1-13. For example, the operations of method 2000 may be performed by the fast activation module 610 as described with reference to FIGS. 6-9. In some examples, a UE 115 may execute a set of codes to control the functional elements of the UE 115 to perform the functions described below. Additionally or alternatively, the UE 115 may perform aspects the functions described below using special-purpose hardware. The method 2000 may also incorporate aspects of methods 1400, 1500, 1600, 1700, 1800, and 1900 of FIGS. 14-19.

At block 2005, the UE 115 may receive a CA configuration including a primary CC and a PUCCH SCC as described with reference to FIGS. 2-5. In certain examples, the operations of block 2005 may be performed by the PUCCH enabled SCell module 845 as described with reference to FIG. 8.

At block 2010, the UE 115 may receive an SR configuration that may include an SR transmission threshold for the primary CC, the secondary CC, or both with a PUCCH as described with reference to FIGS. 2-5. The SR configuration may be received on the primary CC or the secondary CC with a PUCCH, or both. In certain examples, the operations of block 2010 may be performed by the SR module 850 as described with reference to FIG. 8.

Figure 21:
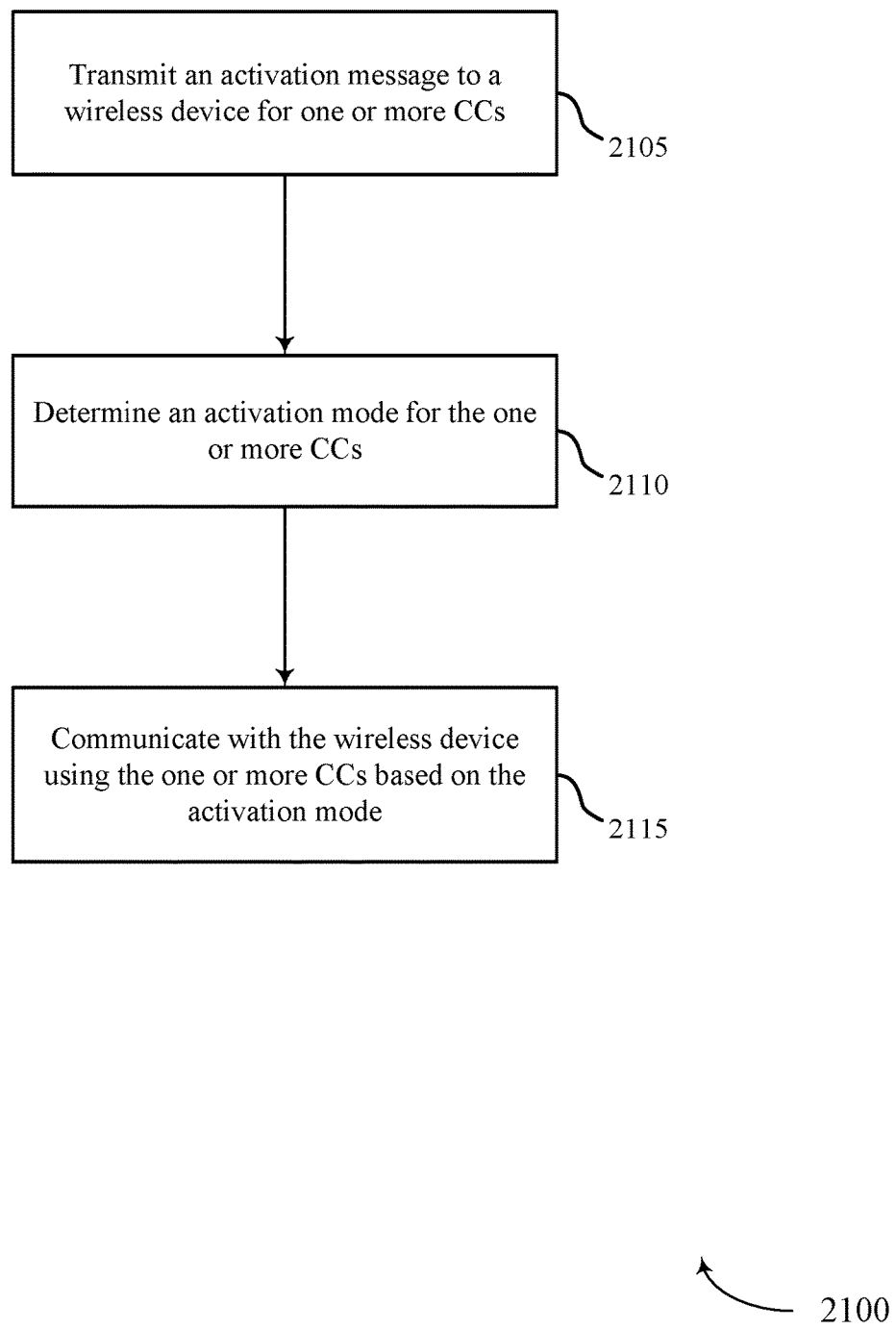

FIG. 21 shows a flowchart illustrating a method 2100 for eCA activation and scheduling request procedures in accordance with various aspects of the present disclosure. The operations of method 2100 may be implemented by a base station 105 or its components as described with reference to FIGS. 1-13. For example, the operations of method 2100 may be performed by the base station fast activation module 1010 as described with reference to FIGS. 10-13. In some examples, a base station 105 may execute a set of codes to control the functional elements of the base station 105 to perform the functions described below. Additionally or alternatively, the base station 105 may perform aspects the functions described below using special-purpose hardware. The method 2100 may also incorporate aspects of methods 1400, 1500, 1600, 1700, 1800, 1900, and 2000 of FIGS. 14-20.

At block 2105, the base station 105 may transmit an activation message to a wireless device for one or more CCs as described with reference to FIGS. 2-5. In certain examples, the operations of block 2105 may be performed by the activation message module 1105 as described with reference to FIG. 11.

At block 2110, the base station 105 may determine an activation mode for the CCs as described with reference to FIGS. 2-5. In certain examples, the operations of block 2110 may be performed by the BS activation mode manager 1110 as described with reference to FIG. 11.

At block 2115, the base station 105 may communicate with the wireless device using the CCs based on the activation mode as described with reference to FIGS. 2-5. In certain examples, the operations of block 2115 may be performed by the fast activation communication module 1115 as described with reference to FIG. 11.

Thus, methods 1400, 1500, 1600, 1700, 1800, 1900, 2000, and 2100 may provide for eCA activation and scheduling request procedures. It should be noted that methods 1400, 1500, 1600, 1700, 1800, 1900, 2000, and 2100 describe possible implementation, and that the operations and the steps may be rearranged or otherwise modified such that other implementations are possible. In some examples, aspects from two or more of the methods 1400, 1500, 1600, 1700, 1800, 1900, 2000, and 2100 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, UMTS, LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks as described herein, the term evolved Node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   triggering activation of one or more component carriers (CCs);
   selecting an activation mode from a plurality of activation modes for the one or more CCs in response to the triggering, wherein each activation mode of the plurality of activation modes is associated with a corresponding activation period, and wherein the plurality of activation modes comprises at least one second activation mode with an activation period shorter than a first activation period corresponding to a first activation mode; and
   monitoring the one or more CCs based at least in part on the activation mode.

2. The method of claim 1, wherein the selected activation mode of the plurality of activation modes is the second activation mode.

3. The method of claim 1, wherein triggering activation of the one or more CCs comprises:
   receiving an activation command from a serving cell, or identifying a trigger condition comprising a channel measurement, a radio resource control (RRC) condition, or both.

4. The method of claim 1, further comprising:
   performing a detection procedure or a synchronization procedure prior to triggering activation the one or more CCs based at least in part on the activation mode.

5. The method of claim 1, further comprising:
   transmitting an indication that the one or more CCs are associated with the activation mode.

6. The method of claim 1, further comprising:
   measuring a channel quality of the one or more CCs, wherein selecting the activation mode for the one or more CCs is based at least in part on the measured channel quality.

7. The method of claim 1, further comprising:
   identifying an activated CC or receiving an indication of an activation group comprising the one or more CCs, wherein determining the activation mode is based at least in part on the activated CC or the activation group.

8. The method of claim 1, further comprising:
   triggering deactivation of the one or more CCs;
   determining a deactivation mode; and
   maintaining synchronization with the one or more CCs based at least in part on the deactivation mode.

9. An apparatus for wireless communication, comprising:
   a processor;
   memory in electronic communication with the processor; and
   instructions stored in the memory and operable, when executed by the processor, to cause the apparatus to:
   trigger activation of one or more component carriers (CCs);
   select an activation mode from a plurality of activation modes for the one or more CCs in response to the triggering, wherein each activation mode of the plurality of activation modes is associated with a corresponding activation period, and wherein the plurality of activation modes comprises at least one second activation mode with an activation period shorter than a first activation period corresponding to a first activation mode; and
   monitor the one or more CCs based at least in part on the activation mode.

10. The apparatus of claim 9, wherein the selected activation mode of the plurality of activation modes is the second activation mode.

11. The apparatus of claim 9, wherein the instructions are operable to cause the apparatus to:
    receive an activation command from a serving cell, or identify a trigger condition comprising a channel measurement, an RRC condition, or both.

12. The apparatus of claim 9, wherein the instructions are operable to cause the apparatus to:

perform a detection procedure or a synchronization procedure prior to triggering activation the one or more CCs based at least in part on the activation mode.

13. The apparatus of claim 9, wherein the instructions are operable to cause the apparatus to:
transmit an indication that the one or more CCs are associated with the activation mode.

14. The apparatus of claim 9, wherein the instructions are operable to cause the apparatus to:
measure a channel quality of the one or more CCs, wherein selecting the activation mode for the one or more CCs is based at least in part on the measured channel quality.

15. The apparatus of claim 9, wherein the instructions are operable to cause the apparatus to:
identify an activated CC or receive an indication of an activation group comprising the one or more CCs, wherein determining the activation mode is based at least in part on the activated CC or the activation group.

16. The apparatus of claim 9, wherein the instructions are operable to cause the apparatus to:
trigger deactivation of the one or more CCs;
determine a deactivation mode; and
maintain synchronization with the one or more CCs based at least in part on the deactivation mode.

17. An apparatus for wireless communication, comprising:
means for triggering activation of one or more component carriers (CCs);
means for selecting an activation mode from a plurality of activation modes for the one or more CCs in response to the triggering, wherein each activation mode of the plurality of activation modes is associated with a corresponding activation period, and wherein the plurality of activation modes comprises at least one second activation mode with an activation period shorter than a first activation period corresponding to a first activation mode; and
means for monitoring the one or more CCs based at least in part on the activation mode.

18. The apparatus of claim 17, wherein means for triggering activation of the one or more CCs comprises:
means for receiving an activation command from a serving cell, or identifying a trigger condition comprising a channel measurement, a radio resource control (RRC) condition, or both.

19. The apparatus of claim 17, further comprising:
means for performing a detection procedure or a synchronization procedure prior to triggering activation the one or more CCs based at least in part on the activation mode.

20. The apparatus of claim 17, further comprising:
means for transmitting an indication that the one or more CCs are associated with the activation mode.

21. The apparatus of claim 17, further comprising:
means for measuring a channel quality of the one or more CCs, wherein selecting the activation mode for the one or more CCs is based at least in part on the measured channel quality.

22. The apparatus of claim 17, further comprising:
means for identifying an activated CC or receiving an indication of an activation group comprising the one or more CCs, wherein determining the activation mode is based at least in part on the activated CC or the activation group.

23. The apparatus of claim 17, further comprising:
means for triggering deactivation of the one or more CCs;
means for determining a deactivation mode; and
means for maintaining synchronization with the one or more CCs based at least in part on the deactivation mode.

24. A non-transitory computer-readable medium storing code for wireless communication at a user equipment (UE), the code comprising instructions executable to:
trigger activation of one or more component carriers (CCs);
select an activation mode from a plurality of activation modes for the one or more CCs in response to the triggering, wherein each activation mode of the plurality of activation modes is associated with a corresponding activation period, and wherein the plurality of activation modes comprises at least one second activation mode with an activation period shorter than a first activation period corresponding to a first activation mode; and
monitor the one or more CCs based at least in part on the activation mode.

25. The non-transitory computer-readable medium of claim 24, wherein the instructions are operable to cause the apparatus to:
receive an activation command from a serving cell, or identify a trigger condition comprising a channel measurement, an RRC condition, or both.

26. The non-transitory computer-readable medium of claim 24, wherein the instructions are operable to cause the apparatus to:
perform a detection procedure or a synchronization procedure prior to triggering activation the one or more CCs based at least in part on the activation mode.

27. The non-transitory computer-readable medium of claim 24, wherein the instructions are operable to cause the apparatus to:
transmit an indication that the one or more CCs are associated with the activation mode.

28. The non-transitory computer-readable medium of claim 24, wherein the instructions are operable to cause the apparatus to:
measure a channel quality of the one or more CCs, wherein selecting the activation mode for the one or more CCs is based at least in part on the measured channel quality.

29. The non-transitory computer-readable medium of claim 24, wherein the instructions are operable to cause the apparatus to:
identify an activated CC or receive an indication of an activation group comprising the one or more CCs, wherein determining the activation mode is based at least in part on the activated CC or the activation group.

30. The non-transitory computer-readable medium of claim 24, wherein the instructions are operable to cause the apparatus to:
trigger deactivation of the one or more CCs;
determine a deactivation mode; and
maintain synchronization with the one or more CCs based at least in part on the deactivation mode.

* * * * *